(12) United States Patent
De Prisco et al.

(10) Patent No.: US 8,036,975 B2
(45) Date of Patent: Oct. 11, 2011

(54) SYSTEMS AND METHODS FOR COMPOUND RISK FACTOR SAMPLING WITH INTEGRATED MARKET AND CREDIT RISK

(75) Inventors: Ben De Prisco, Woodbridge (CA); Ian Iscoe, Mississauga (CA); Yijun Jiang, Toronto (CA); Helmut Mausser, Toronto (CA)

(73) Assignee: Algorithmics Software LLC, Wilmington, DE (US)

( * ) Notice: Subject to any disclaimer, the term of this patent is extended or adjusted under 35 U.S.C. 154(b) by 0 days.

(21) Appl. No.: 13/011,553

(22) Filed: Jan. 21, 2011

(65) Prior Publication Data

US 2011/0119204 A1 May 19, 2011

Related U.S. Application Data

(62) Division of application No. 12/026,781, filed on Feb. 6, 2008, now Pat. No. 7,908,197.

(51) Int. Cl.
*G06Q 40/00* (2006.01)
(52) U.S. Cl. .............. 705/36 R; 705/35; 705/37; 705/38
(58) Field of Classification Search ............... 705/35–45
See application file for complete search history.

(56) References Cited

U.S. PATENT DOCUMENTS

2009/0198629 A1  8/2009  De Prisco et al.

OTHER PUBLICATIONS

Co-pending U.S. Appl. No. 12/026,781, "Systems and Methods for Compound Risk Factor Sampling With Integrated Market and Credit Risk" filed Feb. 6, 2008.

United States Office Action dated Apr. 23, 2010, U.S. Appl. No. 12/026,781.
United States Office Action Response dated Jul. 2, 2010, U.S. Appl. No. 12/026,781.
Interview Summary dated Sep. 7, 2010, U.S. Appl. No. 12/026,781.
United States Restriction Requirement dated Sep. 17, 2010, U.S. Appl. No. 12/026,781.
United States Restriction Requirement Response dated Oct. 14, 2010, U.S. Appl. No. 12/026,781.
United States Office Action dated Nov. 4, 2010, U.S. Appl. No. 12/026,781.
United States Office Action Response dated Nov. 18, 2010, U.S. Appl. No. 12/026,781.
United States Notice of Allowance dated Nov. 26, 2010, U.S. Appl. No. 12/026,781.
Amendment after Notice of Allowance dated Jan. 18, 2011, U.S. Appl. No. 12/026,781.

(Continued)

*Primary Examiner* — James A Kramer
*Assistant Examiner* — Hao Fu
(74) *Attorney, Agent, or Firm* — Bereskin & Parr LLP/S.E.N.C.R.L., s.r.l.

(57) ABSTRACT

Systems and methods for generating an integrated market and credit loss distribution for the purpose of calculating one or more risk measures associated with a portfolio of instruments are disclosed. In at least one embodiment, compound risk factor sampling is performed that comprises conditionally generating multiple systemic credit driver samples for each market risk factor sample generated per time step of a simulation. There are also disclosed systems and methods for determining an optimal number of sample values for each of the market risk factors, systemic credit drivers, and optionally, idiosyncratic credit risk factors that would be required in order to obtain an acceptable amount of variability in the calculated risk estimates and/or to satisfy an available computational budget.

48 Claims, 14 Drawing Sheets

OTHER PUBLICATIONS

De Prisco, Ben, Economic Capital Methodological Advances and Practical Applications, Algo Credit and Capital Forum, Feb. 6, 2007, Algorithmics Inc.

Harris, W. and Helvig, T. (1966), "Marginal and Conditional Distributions of Singular Distributions", Research Institute for Mathematical Sciences, Kyoto University Series A, vol. 1, No. 2. 199-204.

Iscoe, I., Kreinin, A. and Rosen, D. (1999), "An Integrated Market and Credit Portfolio Model", Algo Research Quarterly 2 No. 3, pp. 21-37. Available at: www.defaultrisk.com/pp_model157.htm.

Iscoe, I. and Kreinin, A. (2001), "Default Boundary Problem", Algorithmics Working Paper, Available at: www.finance-research.net/enaa13520t4_kreinin.html.

Kiesel, Rudiger, Perraudin, William and Taylor, Alex, "The Structure of Credit Risk: Spread Volatility and Ratings Transitions", Bank of England 2001, pp. 1-47.

Kijima, Masaaki and Muromachi, Yukio, "Evaluation of Credit Risk of a Portfolio with Stochastic Interest Rate and Default Processes", May 25, 1998, Tokyo Metropolitan University and NLI Research Institute, pp. 229-257.

Marsaglia, G. (1964), "Conditional Mean and Covariances of Normal Variables with Singular Covariance Matrix", Journal of the American Statistical Association, 1203-1204.

Medova, E.A. and Smith, R.G., "A Framework to Measure Integrated Risk", Presented to: EURO Working Group on Financial Modelling Conference, Imperial College, Apr. 25, 2003, Judge Institute of Management, University of Cambridge, pp. 1-29.

Parzen, E. (1962), "On Estimation of a Probability Density and Mode", Ann. Math. Statist. 33 1065-1076.

Sen, P.K. (1968), Asymptotic Normality of Sample Quantiles for m-dependent processes. Ann. Math. Statist. 39 1724-1730.

Silverman, B. (1986), "Density Estimation for Statistics and Data Analysis", Chapman and Hall, London, pp. 15, 34-35, 43-48.

Turlach, B. A. (1993), "Bandwidth Selection in Kernel Density Estimation: A review", Technical Report, Univ. Catholique de Louvain.

Algorithmics Inc., "Portfolio Credit Risk Engine: A Framework for the Management of Enterprise Credit Risk", 2005 powerpoint slide presentation.

Algo Credit and Capital Forum, "Risk Management Insights from Practitioners and Industry Experts", Feb. 6, 2007, The Dorchester, London.

Barnhill, Theodore M., Jr. and Maxwell, William F., "Modeling Correlated Interest Rate, Exchange Rate, and Credit Risk in Fixed Income Portfolios", The George Washington University and Texas Tech University, pp. 1-24.

BIS (2006) Treatment of Counterparty Credit Risk and Cross Product Netting. Annex 4 in Basel II: International Convergence of Capital Measurement and Capital Standards: A Revised Framework—Comprehensive Version, BCBS, Jun. 2006. Available at www.bis.org/publ/bcbs128.htm.

De Prisco, B., Iscoe, I., Jiang, Y., and Mausser, H., "Compound Scenarios: An Efficient Framework for Integrated Market-Credit Risk", Algorithmics, Inc., Jul. 27, 2007, pp. 1-25.

Dimakos, Xeni K. and Aas, Kjersti, "Integrated Risk Modelling", Dec. 18, 2003, Norwegian Computing Center, Oslo, Norway, pp. 1-13.

Gordy, Michael and Juneja, Sandeep, "Efficient Simulation for Risk Measurement in Portfolio of CDOS", Proceedings of the 2006 Winter Simulation Conference, 2006 IEEE.

Grundke, P. (2006), "Integrated Risk Management: Top down or Bottom Up?", Working Paper. Available at: www.gloriamundi.org/picsresources/pg_irm.pdf.

Grundke, P., "Integrating Interest Rate Risk in Credit Portfolio Models", revised version Sep. 2003, University of Cologne, pp. 1-29.

Grundke, P., "On the Applicability of Fourier Based Methods to Credit Portfolio Models with Integrated Interest Rate and Credit Spread Risk", revised version Sep. 2005, University of Cologne, pp. 1-38.

Grundke, P. (2004), "Risk Measurement with Integrated Market and Credit Portfolio Models", University of Cologne, pp. 1-40.

Wand, M.P. and Jones, M.C. (1995), "Kernel Smoothing", Monographs on Statistics and Applied Probability, No. 60, Chapman and Hall, New York, pp. 11-14 and pp. 59-63.

Black, Richard and Ben De Prisco, "New Developments in Research and Financial Engineering", Algorithmics Inc. Sep. 26, 2007.

Co-pending U.S. Appl. No. (To Be Assigned), "Systems and Methods for Compound Risk Factor Sampling With Integrated Market and Credit Risk" filed Jan. 21, 2011, a further Divisional Application based on U.S. Appl. No. 12/026,781.

SYSTEMS AND METHODS FOR COMPOUND RISK FACTOR SAMPLING WITH INTEGRATED MARKET AND CREDIT RISK

CROSS-REFERENCE TO RELATED APPLICATION

This application is a divisional of prior U.S. patent application Ser. No. 12/026,781, filed on Feb. 6, 2008, the entirety of which is hereby incorporated by reference.

TECHNICAL FIELD

Embodiments described herein relate generally to systems and methods for measuring risk associated with a portfolio, and in particular, to systems and methods for compound risk factor sampling with integrated market and credit risk for use in determining a portfolio loss distribution.

BACKGROUND

Financial institutions, resource-based corporations, trading organizations, governments, and others may employ risk management systems and methods to measure risk associated with portfolios comprising credit-risky instruments, such as for example, the trading book of a bank. Accurately evaluating the risk associated with a portfolio of instruments may assist in the management of the portfolio. For example, it may allow opportunities for changing the composition of the portfolio in order to reduce the overall risk or to achieve an acceptable level of risk to be identified.

Evaluating the risk associated with a portfolio is a non-trivial task, as instruments (e.g. securities, loans, corporate bonds, credit derivatives, etc.) in the portfolio can be of varying complexity, and may be subject to different types of risk. An instrument may lose value due to adverse changes in market risk factors, for example. An instrument may also lose value due to changes in the credit state (e.g. a downgrade) of the counterparty associated with the instrument, for example. Consider, by way of illustration, that the price of a bond generally declines as interest rates rise. Interest rates are examples of market risk factors. Further examples of market risk factors may include equity indices, foreign exchange rates, and commodity prices.

Also consider, by way of illustration, that an AA-rated counterparty associated with an instrument of the portfolio may transition to a credit state with a lower rating (e.g., B) or one with a higher rating (e.g., AAA), resulting in an accompanying decrease or increase, respectively, in the values of its financial obligations. These changes may, in turn, affect the values of the associated instrument. In an extreme case, a counterparty may default, typically leaving creditors able to recover only some fraction of the value of their instruments with the counterparty.

Credit state migrations (e.g. transitions to different credit states) may be determined by evaluating movements of a creditworthiness index calculated for a specific counterparty. The creditworthiness index may be based on values of a number of systemic credit drivers that generally affect all counterparties and of an idiosyncratic credit risk factor associated with the specific counterparty.

The systemic credit drivers may comprise macroeconomic variables or indices, such as for example, gross domestic product (GDP), inflation rates, and country/industry indices. Accordingly, these systemic credit drivers generally provide a credit correlation between different counterparty names in a portfolio. In contrast, each idiosyncratic credit risk factor is a latent variable independently associated with a specific counterparty name in the portfolio. Accordingly, these idiosyncratic credit risk factors may also be referred to as counterparty-specific credit risk factors herein.

In general, changes to market risk factors and systemic credit drivers tend to be correlated (i.e. in statistical terms, the market risk factors and systemic credit drivers are co-dependent, not independent). Accordingly, many modern risk management systems and methods may be expected to employ methodologies that integrate market and credit risk (e.g. by ensuring that such co-dependence is reflected in the computation of risk measures associated with a portfolio) in order to more accurately assess the financial risks associated with portfolios of interest. Furthermore, approaches that integrate market and credit risk have been further validated by the advent of the International Standard for Banking Regulations Basel II.

To evaluate risk associated with a portfolio, at least some risk management systems and methods perform simulations in which a portfolio of instruments evolves under a set of scenarios (e.g. a set of possible future outcomes, each of which may have an associated probability of occurrence) over some specified time horizon. The losses (or gains) that a portfolio of interest may incur over all possible scenarios might be represented by a loss distribution. With knowledge of the loss distribution associated with the portfolio, it is possible to compute a risk measure for the portfolio of interest.

However, as it is not possible to determine the exact loss distribution analytically, it may be approximated by an empirical distribution. By way of simulation, under each scenario, an individual loss sample may be generated. The scenario used to generate a given loss sample may represent a certain specific set of market and credit conditions, identified by particular sampled values of market risk factors, systemic credit drivers and/or idiosyncratic credit risk factors defined for the respective scenario.

The loss samples generated under a plurality of scenarios may be used to generate the empirical distribution that approximates the actual loss distribution. Accordingly, it will be understood that the larger the number of scenarios used in the simulation and thus the larger the number of loss samples generated, the more accurate the approximation of the actual loss distribution will be.

Estimates of risk measures associated with the portfolio may then be computed based on the empirical distribution that approximates the actual loss distribution. In this regard, the quality of the estimated measurement of risk will also depend on the number of loss samples generated. It will be understood that the individual loss samples may also be referred to collectively as a "loss sample", and the number of individual loss samples may be referred to as the size of the "loss sample".

Some known risk management systems generate loss samples according to a methodology that may be classified as a "simple sampling" approach. In accordance with a "simple sampling" approach, to generate a given loss sample, a corresponding market risk factor sample, systemic credit driver sample, and idiosyncratic credit risk factor sample is generated. In order to integrate market and credit risk, the market risk factors and systemic credit drivers are assumed to evolve in accordance with a pre-specified co-dependence structure. It will be understood that in order to obtain N loss samples using this approach, N market risk factor samples, N systemic credit driver samples, and N idiosyncratic credit risk factor samples will be generated in the simulation for a portfolio of interest. Accordingly, the "simple sampling" approach may be considered to be an example of a "brute force" approach to generating loss samples for the portfolio in the simulation.

Some other known risk management systems generate loss samples according to a methodology that may be classified as a "two-tier" approach. In accordance with a "two-tier" approach, a joint sample of market risk factors and systemic credit drivers is combined with multiple samples of idiosyncratic credit risk factor values to obtain multiple loss samples. In order to integrate market and credit risk, the market risk factors and systemic credit drivers are assumed to evolve in accordance with a pre-specified co-dependence structure. The "two-tier" approach attempts to reduce the number of market risk factor and systemic credit driver samples needed to obtain N loss samples. However, it will be understood that if joint samples of market risk factors and systemic credit drivers are employed, where there is a need to consider a larger number of samples of one type of risk factor (e.g. systemic credit drivers), then a larger number of samples of the other type of risk factor (e.g. market risk factors) will be required.

Yet other known risk management systems do not attempt to integrate market and credit risk when evaluating risk associated with a portfolio. For example, some known risk management systems may derive a loss distribution analytically, ignoring the correlation between changes in market risk factors and systemic credit drivers that exists, in reality.

SUMMARY

In one broad aspect, there is provided a computer-implemented method for generating an integrated market and credit loss distribution for the purpose of calculating one or more risk measures associated with a portfolio of instruments by performing a simulation, the method comprising at least the acts of: generating N scenarios, said N scenarios defined by N sets of X, Y, and Z values $(X_m, Y_{ms}, Z_{msi})$ for all m from 1 to M, for all s from 1 to S, and for all i from 1 to I, wherein X, Y and Z comprise a market risk factor process, a systemic credit driver process, and an idiosyncratic credit risk factor process, respectively; and computing N simulated loss samples by simulating the portfolio over the N scenarios over a first time horizon to produce the integrated market and credit loss distribution over the first time horizon; wherein said act of generating MS scenarios comprises: for each m from 1 to M, generating a sample, having index m, of a vector $\Xi$ of normal random variables; for each m from 1 to M and for each from 1 to S, generating a random sample, having index ms, of $\Delta Y$ from a conditional distribution of $\Delta Y$ derived from the sample of the vector $\Xi$ having index m and from a co-variance matrix, $\Delta Y$ being an increment of Y; for each m from 1 to M and for each s from 1 to S and for each i from 1 to I, independently generating a random sample, having index msi, of $\Delta Z$, $\Delta Z$ being an increment of Z; and computing said N sets of X, Y, and Z values $(X_m, Y_{ms}, Z_{msi})$ for all m from 1 to M, for all s from 1 to S, and for all i from 1 to I, wherein $X_m$ is calculated as a value of X at the first time horizon based on a previous value of $X_m$, at least one function associated with X, and the sample having index m of the vector $\Xi$, wherein $Y_{ms}$ is calculated as a value of Y at the first time horizon based on a previous value of $Y_{ms}$, a function associated with Y, and the random sample having index ms of $\Delta Y$, and wherein $Z_{msi}$ is calculated as a value of Z at the first time horizon based on a previous value of $Z_{msi}$, a function associated with Z, and the random sample having index msi of $\Delta Z$.

In another broad aspect, there is provided a computer-implemented method for generating an integrated market and credit loss distribution for the purpose of calculating one or more risk measures associated with a portfolio of instruments by performing a simulation, the method comprising at least the acts of: generating MS scenarios defined by MS sets of X and Y values $(X_m, Y_{ms})$ for all m from 1 to M, and for all s from 1 to S, wherein X and Y comprise a market risk factor process and a systemic credit driver process, respectively; for each of the MS scenarios, analytically deriving a conditional loss distribution $F_{X_m Y_{ms}}$ to generate MS conditional loss distributions for a first time horizon, computing the integrated market and credit loss distribution from the conditional loss distributions for the first time horizon; wherein said act of generating MS scenarios comprises: for each m from 1 to M, generating a sample, having index m, of a vector $\Xi$ of normal random variables; for each m from 1 to M and for each s from 1 to S, generating a random sample, having index ms, of $\Delta Y$ from a conditional distribution of $\Delta Y$ derived from the sample of the vector $\Xi$ having index m and from a co-variance matrix, $\Delta Y$ being an increment of Y; computing said MS sets of X and Y values $(X_m, Y_{ms})$ for all m from 1 to M, and for all s from 1 to S, wherein $X_m$ is calculated as a value of X at a first time horizon based on a previous value of $X_m$, at least one function associated with X, and the sample having index m of the vector $\Xi$, and wherein $Y_{ms}$ is calculated as a value of Y at the first time horizon based on a previous value of $Y_{ms}$, a function associated with Y, and the random sample having index ms of $\Delta Y$.

Other aspects, embodiments, and features are also disclosed herein.

BRIEF DESCRIPTION OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
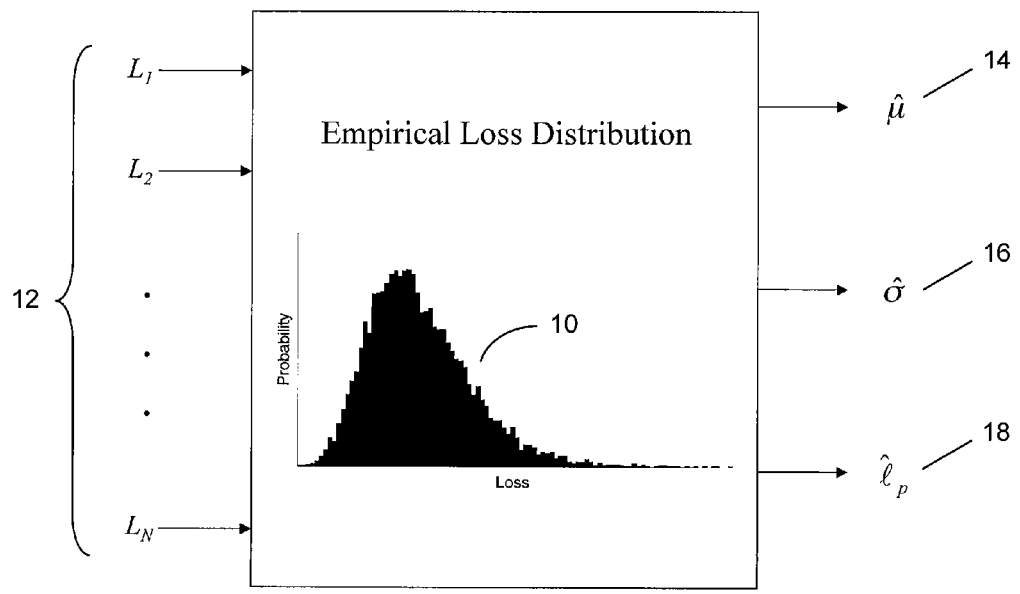
FIG. 1 shows an example loss histogram of an empirical loss distribution.

Specific details are set forth herein, in order to facilitate understanding of various embodiments. However, it will be understood by those of ordinary skill in the art that some embodiments may be practiced without these specific details. In other instances, well-known methods, procedures and components have not been described in detail so as not to obscure the embodiments described herein. Furthermore, details of the embodiments described herein, which are provided by way of example, are not to be considered as limiting the scope of the appended claims.

Embodiments described herein relate generally to risk management systems and methods for evaluating risk associated with a portfolio of instruments. Generally, the system (and modules) described herein may be implemented in computer hardware and/or software. The acts described herein are performed on a computer, which comprises at least one processor and at least one memory, as well as other components as will be understood by persons skilled in the art. Accordingly, one or more modules may be configured to perform acts described herein when executed on the computer (e.g. by the at least one processor). Modules and associated data (e.g. instructions, input data, output data, intermediate results generated which may be permanently or temporarily stored) may be stored in the at least one memory, which may comprise one or more known memory or storage devices. The acts performed in respect of a method in accordance with an embodiment described herein may be provided as instructions, executable on a computer, on a computer-readable storage medium. In some embodiments, the computer-readable storage medium may comprise transmission-type media.

It will also be understood that although reference may be made to a "computer" herein, the "computer" may comprise multiple computing devices, which may be communicatively coupled by one or more network connections. In particular, one or more modules may be distributed across multiple computing devices. It will also be understood that certain functions depicted in the example embodiments described herein as being performed by a given module may instead be performed by one or more different modules or otherwise integrated in the functions performed by one or more different modules.

Risk management systems and methods typically evaluate risk associated with a portfolio of instruments by computing one or more risk measures derived from characteristics of a loss distribution F associated with the portfolio. For example, these characteristics of F may comprise the mean of the loss distribution, the variance of the loss distribution and/or a specified quantile value of the loss distribution. Some regulations (e.g. Basel II) may require that a bank hold sufficient capital to offset a maximum loss that can occur with a given probability p, consistent with the bank's desired credit rating. This loss, known as the Value-at-Risk (VaR), equals the p-th quantile $l_p$ of the portfolio loss distribution F, where $l_p F^{-1}(p)$.

Due to the complex relationships among, for example, asset prices, exposures, and credit state migrations that affect the instruments of a portfolio, the exact distribution F cannot generally be derived analytically. Rather, it may be approximated by an empirical loss distribution $\hat{F}$, which may be obtained by simulating the portfolio under a set of possible future outcomes, or scenarios, to obtain a set of N loss samples to derive the empirical loss distribution. Risk measures may then be computed based on the empirical loss distribution $\hat{F}$, which approximates the actual distribution F.

Referring now to FIG. 1, there is shown an example loss histogram 10 of an empirical loss distribution constructed from a set of N loss samples 12 (i.e. $L_1$ to $L_N$) for use in deriving one or more estimates of relevant characteristics such as, for example, an estimated mean 14 ($\hat{\mu}$), an estimated variance 16 ($\hat{\sigma}^2$) and an estimated p-th quantile 18 ($\hat{l}_p$). Other relevant characteristics may also be derived from the empirical loss distribution, including an estimated unexpected loss (i.e. difference between a p-th quantile and a mean), and an estimated expected shortfall (i.e. an expected value of losses given that they exceed a p-th quantile, a conditional expectation of losses in the tail of the loss distribution). A circumflex "^" over a parameter is used herein to indicate a statistical estimate of the parameter.

The degree to which $\hat{F}$ approximates F, and thus the quality of the associated risk estimates, typically depends on the number of loss samples N (also referred to herein generally as the "sample size").

Figure 2:
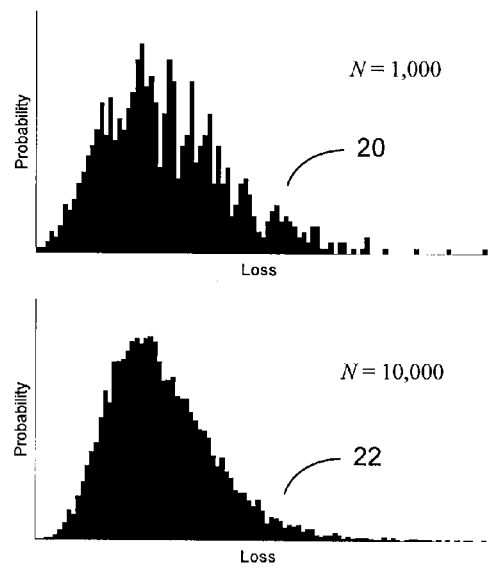
FIG. 2 shows two example loss histograms of empirical loss distributions for different sample sizes.

Referring now to FIG. 2, there is shown two example loss histograms 20, 22 of empirical loss distributions constructed from loss samples of two different sizes N. In this example, loss histogram 20 and loss histogram 22 represent empirical loss distributions constructed from N=1,000 and N=10,000 loss samples, respectively. It will be understood that as N increases, the loss histogram, and accordingly the empirical loss distribution, generally becomes smoother, which reflects a better degree of approximation of F and may provide the basis for more accurate estimates of risk measures that are calculated from the loss distribution.

The effect of the sample size is especially pronounced when estimating quantiles for p close to 1, which is typical for credit portfolios. The quantiles for p close to 1 lie in the extreme right tail of the loss histograms 20, 22 of FIG. 2. Ideally, if multiple simulations of N samples each are performed, the resulting risk estimates should remain more or less constant, i.e., the variability of each of the risk estimates should be small. It will be understood that the variability of a risk estimate will generally decrease as N increases. In practice, accurately estimating relevant quantiles for credit portfolios requires the number of loss samples N to be extremely large (e.g., in the millions).

Figure 3:
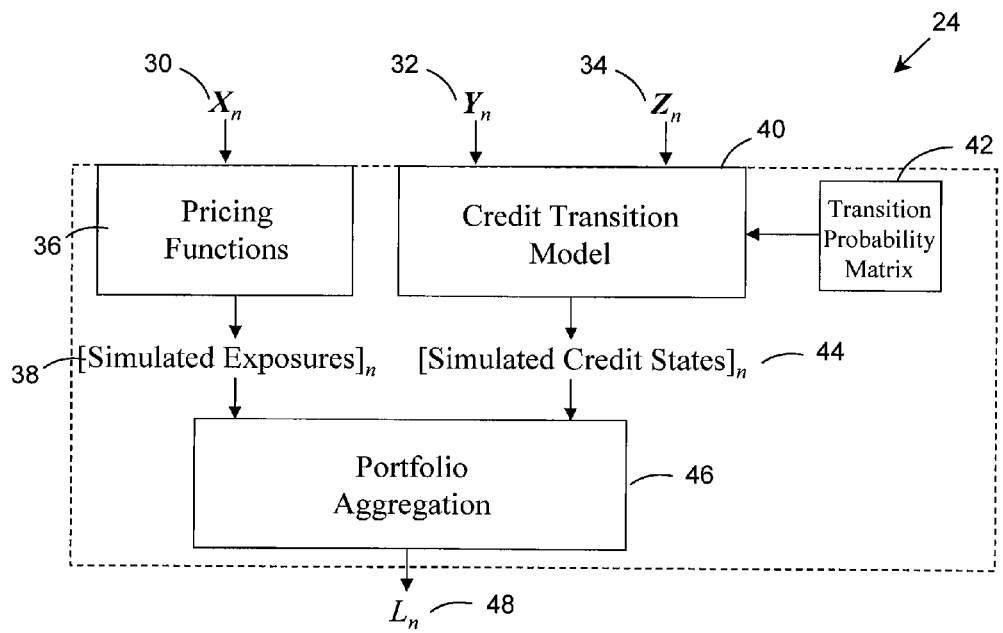
FIG. 3 shows an example block diagram of a loss sample computation module for computing a particular loss sample $L_n$.

Referring now to FIG. 3, there is shown an example block diagram of a loss sample computation module 24 for computing a particular loss sample $L_n$ 48 of a set of N loss samples, which may be used to derive an empirical loss distribution for a portfolio of interest. The loss sample computation module 24 receives as input a set of sampled values for one or more sets of risk factors 30, 32, 34, which may be categorized into three groups as follows:

$X_n$ 30 denotes sampled values of one or more market risk factors, e.g., interest rates, equity indices, foreign exchange rates, and commodity prices;

$Y_n$ 32 denotes sampled values of one or more systemic credit drivers, e.g., macroeconomic factors such as GDP and inflation rates, and country/industry sector indices; and $Z_n$ 34 denotes sampled values of one or more counterparty-specific, or idiosyncratic credit risk factors.

The loss sample computation module 24 may comprise a pricing module 36, a credit transition module 40, and a portfolio aggregation module 46.

Pricing module 36 may be configured to apply one or more pricing functions to the sampled values of market risk factors $X_n$ 30 received as input, and to compute the prices of the financial instruments in the portfolio. The market risk factors jointly determine the prices of all financial instruments in the portfolio. Given the prices, the pricing module 36 may compute a simulated exposure table 38 for each counterparty named in the portfolio. Each simulated exposure table 38 indicates the amounts that would be lost or gained if the respective counterparty transitioned to any one of a number of possible credit states. The pricing module 36 can determine the data for each simulated exposure table 38 either stochastically and/or deterministically. Data for each simulated exposure table 38 can be stored in one or more computer memories or storage devices.

A credit transition module 40 may be configured to receive as input sampled values of systemic credit drivers $Y_n$ 32 and sampled values of idiosyncratic credit risk factors $Z_n$ 34, and to apply a credit transition model to compute a simulated credit state for each counterparty named in the portfolio. The eventual credit state of a counterparty depends on the values of a subset of systemic credit drivers that are common to all counterparties (e.g. sampled values of systemic credit drivers $Y_n$ 32), and on (b) the value of a single credit risk factor unique to that counterparty (e.g. selected from the sampled values of idiosyncratic credit risk factors $Z_n$ 34).

The credit transition module 40 may also be configured to compute a numerical creditworthiness index for each counterparty as a weighted sum of the sampled values of systemic credit drivers $Y_n$ 32 and one of the sampled values of idiosyncratic credit risk factors $Z_n$ 34. For example, a vector of creditworthiness indices $W=\beta Y+\sigma Z$ may be computed, where $\beta$ is a matrix of factor loadings and $\sigma$ is a diagonal matrix of residual specific risk volatilities, with Y being a vector comprising sampled values of systemic credit drivers and Z being a vector comprising sampled values of idiosyncratic credit risk factors.

Then each counterparty's simulated credit state may be determined by comparing its associated creditworthiness index to a set of threshold values as determined from a specified matrix of credit transition probabilities 42. In particular, a default for a given counterparty may be deemed to occur when its component value of W falls below a certain predetermined threshold value, as determined from the matrix of credit transition probabilities 42. Data used to populate the specified matrix of credit transition probabilities 42 may be determined based on historical data. Accordingly, the credit transition module 40 outputs a table of simulated credit states 44 for each counterparty, from which a credit state for each counterparty named in the portfolio can be determined. Data for each table of simulated credit states 44, one per YZ pair, can be stored in one or more computer memories or storage devices.

For each counterparty in the portfolio, a portfolio aggregation module 46 determines a sampled loss from instruments with the specific counterparty. The portfolio aggregation module obtains these counterparty losses using the associated table of simulated credit states 44 (which provides the simulated credit state for each counterparty) in conjunction with the associated simulated exposure table 38 (which indicates the amount that would be lost or gained if a specific counterparty transitioned to any one of a number of possible credit states). In this example, given the credit state of a counterparty, the sample loss from instruments with the counterparty may be looked up in its associated exposure table. The portfolio aggregation module 46 is configured to then compute the aggregate portfolio loss sample $L_n$ 48 as the sum of the losses from counterparties. Generated loss samples can be stored in one or more computer memories or storage devices.

The inventors recognized that the computational resources (e.g., time and/or memory) required to implement each of the modules shown in FIG. 3, and the various determinations they are configured to perform can differ greatly amongst modules depending on the specific input processed.

For example, consider that a particular counterparty's credit state may depend on multiple systemic credit drivers, but on only one idiosyncratic credit risk factor. When the credit transition module 40 computes a creditworthiness index for a given counterparty, processing the set of sampled values of systemic credit drivers $Y_n$ 32 generally comprises a greater portion of the computational work relative to that required to generate the sampled value of the one idiosyncratic credit risk factor from the set of sampled values of idiosyncratic credit risk factors $Z_n$ 34.

More significantly, computing simulated exposure tables 38 from the sampled values of market risk factors $X_n$ 30 requires the pricing module 36 to price all financial instruments in the portfolio. Since the number of instruments of a portfolio of interest may be very large and will typically far exceed the number of counterparties named in the portfolio, and given that pricing is a mathematically intensive procedure (e.g. especially for derivatives), the act of computing simulated exposure tables 38 by pricing module 36 is generally far more computationally expensive than the computing of simulated credit state tables 44 by the credit transition module 40.

Figure 4:
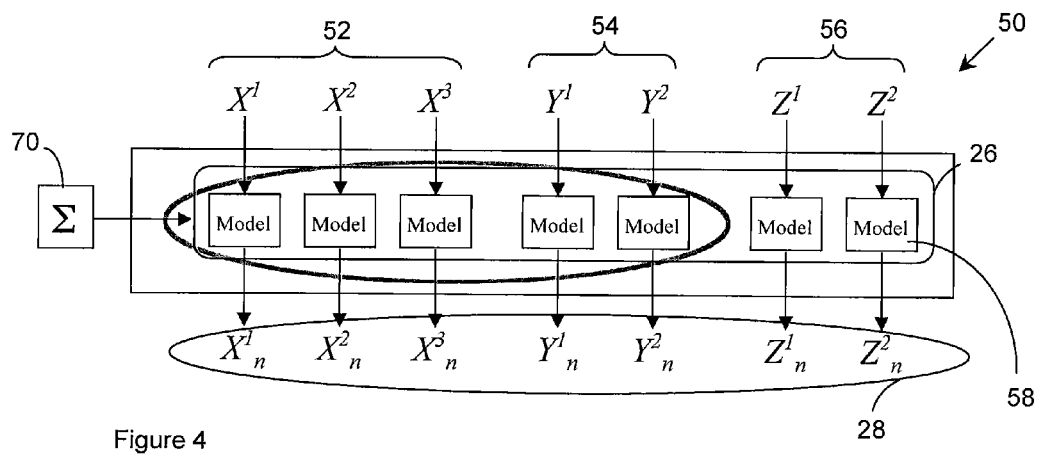
FIG. 4 shows an example block diagram of a risk factor sampling module for generating risk factor samples.

Referring now to FIG. 4, there is shown an example block diagram of a risk factor sampling module 50 that applies risk factor models 26 to generate samples of various risk factors 52, 54, 56 at a time step of a predetermined simulation time horizon. For illustrative purposes, the risk factor sampling module 50 is shown in the example of FIG. 4 as generating samples for three market risk factors 52 ($X^1$, $X^2$, $X^3$), two systemic credit drivers 54 ($Y^1$, $Y^2$) and two idiosyncratic credit risk factors 56 ($Z^1$, $Z^2$) at each iteration, or time step. For example, at iteration n risk factor simulation module 50 generates a sample $X_n^1$ for a modeled market risk factor $X^1$.

It will be understood that the evolution of each risk factor is governed by an appropriate mathematical model. In this example, specific risk factor models 26 govern the evolution of each risk factor 52, 54, 56 over a predetermined time horizon (or in some instances, multiple time horizons). That is, the risk factor models 26 govern how the risk factor sampling module 50 generates samples of risk factor values 28 for each of the risk factors 52, 54, 56 at each time step of the time horizon. By way of example, FIG. 4 shows how an idiosyncratic credit risk factor $Z^2$ is sampled (to produce sample $Z_n^2$) according to a specific idiosyncratic credit risk factor model 58.

Figure 5:
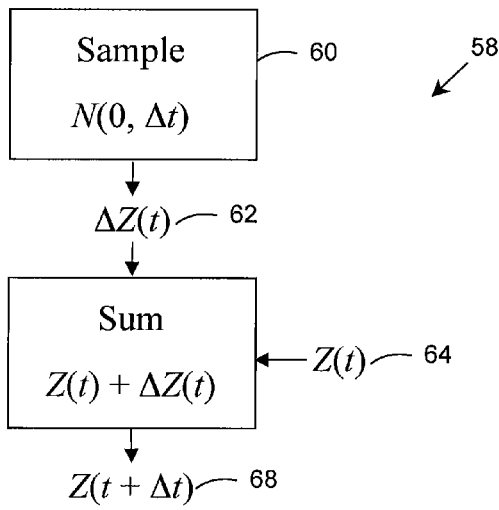
FIG. 5 shows an example block diagram of a risk factor model for defining the generation of a risk factor sample.

Referring now to FIG. 5, there is shown an example diagram of idiosyncratic credit risk factor model 58, which defines the evolution of an idiosyncratic credit risk factor from time t to t+Δt. That is, the idiosyncratic credit risk factor model 58 defines how the risk factor sampling module (e.g. 50 of FIG. 4) generates a risk factor sample Z(t+Δt) 68 for the time step ending at time t+Δt. For example, idiosyncratic credit risk factor Z(t+Δt) 68 is modeled by idiosyncratic credit risk factor model 58, which is a Brownian motion.

Applying the idiosyncratic credit risk factor model 58 results in the generation of an increment value ΔZ(t) 62 from a sample 60 having a normal distribution with mean zero and variance Δt. Increment value ΔZ(t) 62 is added to the risk factor sample Z(t) 64 previously generated for the time step ending at time t to obtain the newly simulated risk factor sample Z(t+Δt) 68. This process is repeated until t+Δt equals the time horizon of the simulation, yielding a "sample path" of risk factor sample values over the time horizon.

Figure 6:
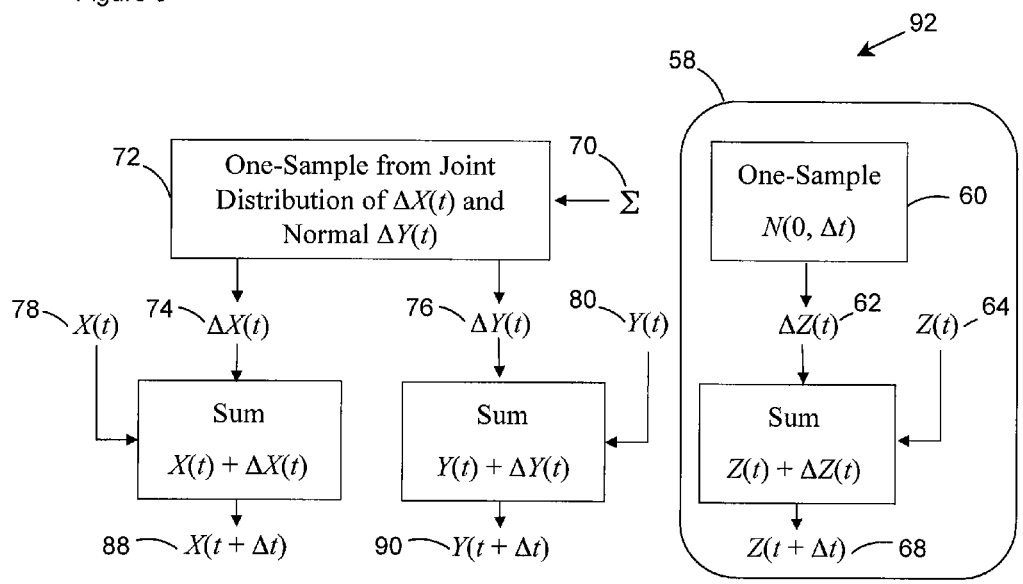
FIG. 6 shows an example block diagram of a risk factor model module for use in a risk factor sampling module implementing a known "simple sampling" approach to generating risk factor samples.

Referring now to FIG. 6, there is shown an example block diagram of a risk factor model module 92 for use in a risk factor sampling module (e.g. 50 of FIG. 4) implementing a known "simple sampling" approach to generating risk factor samples. The models applied by risk factor model module 92 govern the evolution of three different types of risk factors: market risk factors X(t), systemic credit drivers Y(t), and idiosyncratic credit risk factors Z(t). In one example implementation, risk factor model module 92 may apply three different risk factor models (e.g. risk factor model 26), one risk factor model for each type of risk factor.

The known "simple sampling" approach generally involves generating one sample for each risk factor at each time step (i.e. an evolution from time t to t+Δt). The risk factor model module 92 that implements the "simple sampling" approach attempts to integrate market and credit risk. Market risk factors X(t) and systemic credit drivers Y(t) evolve in a correlated manner as specified by a pre-specified co-variance matrix Σ 70.

As shown at 72, a joint sample of an increment value ΔX(t) 74 and increment value ΔY(t) 76 is generated according to the pre-specified co-variance matrix Σ 70 from the joint distribution of increment value ΔX(t) 74 and ΔY(t) 76, where ΔY(t) 76 is represented by a centered, normal distribution. Subsequently, these values are added to the risk factor samples X(t) 78 and Y(t) 80 previously generated at the time step ending at time t, to obtain newly simulated risk factor samples, X(t+Δt) 88 and Y(t+Δt) 90 respectively.

Idiosyncratic credit risk factors are, by definition, independent and therefore they are unaffected by the co-dependence structure Σ 70. The risk factor model module 92 may generate samples of the idiosyncratic credit risk factors, as was described with reference to the risk factor model 58 of FIG. 5, for example. Accordingly, in one aspect, risk factor model module 92 is configured to apply an idiosyncratic credit risk factor model 58 to generate samples of the idiosyncratic credit risk factors.

This risk factor model module 92 repeats this process until all required risk factor samples are generated for all (of one or more) time steps, i.e. when t+Δt equals the time horizon for the simulation.

Figure 7:
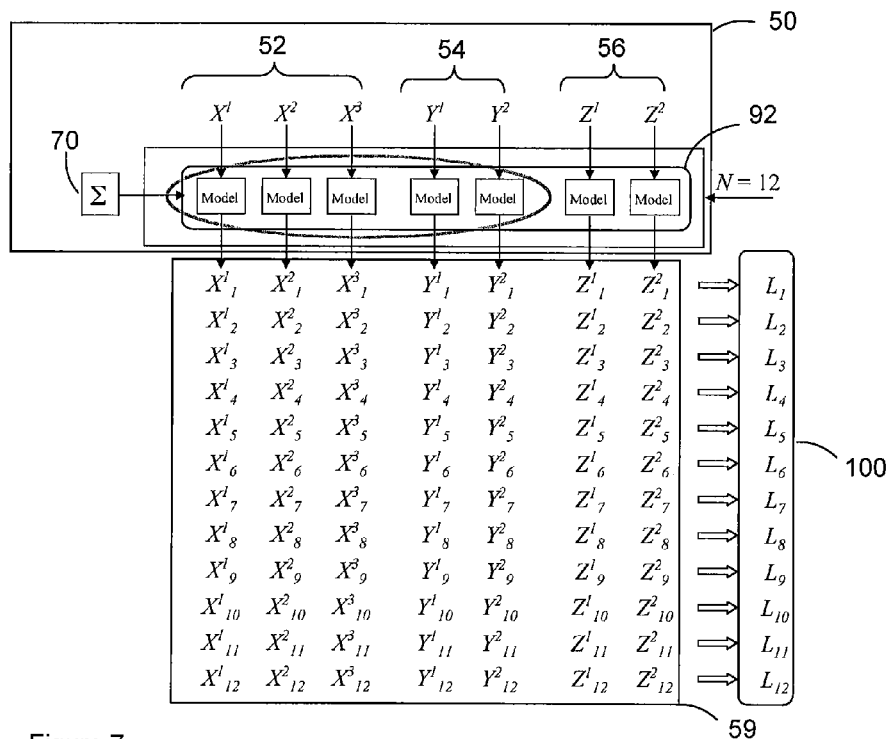
FIG. 7 shows an example block diagram illustrating example output of a risk factor sampling module comprising the risk factor model module of FIG. 6.

Referring now to FIG. 7, there is shown an example block diagram illustrating example output of a risk factor sampling module 50 comprising the risk factor model module 92 of FIG. 6, which implements the "simple sampling" approach. A resultant set of risk factor samples 59 generated by the risk factor sampling module 50 is shown. This resulting set of risk factor samples 59 may then be input to and processed by, for example, loss sample computation module 24 (FIG. 3) to obtain N=12 loss samples 100 (e.g. $L_1$ to $L_{12}$ in this example).

It will be understood that in order to produce N=12 loss samples using a simple sampling approach, N=12 distinct risk factor sampled values for each risk factor 52, 54, 56 are produced by risk factor model module 92. For example, the market risk factor X' is sampled N=12 times. Then, each of the sampled values for the given market risk factor (i.e. each of the N=12 values for $X^1$) is used only once, along with the other corresponding sampled risk factors (e.g. one of the N=12 values produced for each of $X^2$, $X^3$, $Y^1$, $Y^2$, $Z^1$, $Z^2$ in the example of FIG. 7) to compute a corresponding one of the resultant N loss samples.

Since each risk factor is sampled N=12 times, as a result, the N=12 sampled losses ($L_1$ to $L_{12}$), are independent. Generally, it will also be understood that since N samples of each market risk factor 52 are generated, the loss sample computation module 24 (FIG. 3) will need to calculate N sets of simulated exposure tables 38 (FIG. 3), which is a relatively highly computationally expensive task, one for each of the N portfolio loss samples.

By way of example, referring back to FIG. 3, for n=1, then a generated set of market risk factor samples ($X_1^1$, $X_1^2$, $X_1^3$) is provided as input $X_n$ 30 to the pricing module 36 for use in calculating a first simulated exposure table 38, which in turn is used in obtaining a first loss sample $L_1$ 48. This step may be repeated to calculate multiple loss samples.

This illustrates that with a "simple sampling" approach, although the joint samples are taken for the samples of market risk factors and systemic credit drivers in accordance with a pre-specified co-dependence structure used in an attempt to integrate credit and market risk, N samples of each risk factor must be generated. This may result in computational and resource inefficiencies, particularly since N sets of simulated exposure tables will need to be generated in the simulation under this approach, and in use, N may be very large.

Typically, the number of loss samples N that can be generated in practice is limited by the availability of computing resources (e.g. time and/or memory). Thus resource and/or time intensive processes act as constraints on the number of loss samples N that may be simulated.

In the development of a second known approach to generating risk factor samples as described below, it was recognized that since the idiosyncratic credit risk factors $Z_n$ are independent of the market risk factors $X_n$ and systemic credit drivers $Y_n$, any sample of a credit risk factor $Z_k$ can be combined with the joint sample of market risk factors and credit drivers ($X_n$, $Y_n$) taken, while still preserving the required co-dependence structure for market risk factors $X_n$ and systemic credit drivers $Y_n$. It was also recognized that processing the sample idiosyncratic credit risk factor values $Z_n$ to compute creditworthiness indices is generally computationally inexpensive, relative to other processing acts performed when computing loss samples.

Figure 8:
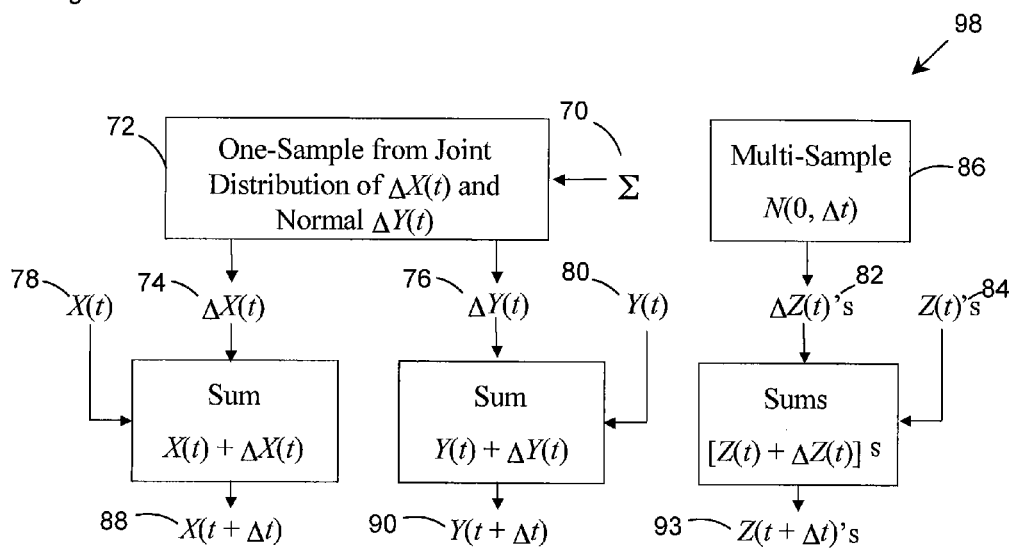
FIG. 8 shows an example block diagram of a risk factor model module for use in a risk factor sampling module implementing a known "two-tiered" approach to generating risk factor samples.

Referring now to FIG. 8, there is shown an example block diagram of a risk factor model module 98 for use in a risk factor simulation module implementing a "two-tiered" approach to generating risk factor samples. The illustrated "two-tiered" approach generally involves generating multiple joint samples (less than N) of the market risk factors and systemic credit drivers, and combining each joint sample with multiple samples of the idiosyncratic credit risk factors to obtain N loss samples. As a result, under the "two-tiered" approach, a single joint market risk factor and systemic credit driver sample may be re-used to produce multiple loss samples.

In the example of FIG. 8, the risk factor model module 98 generates joint samples of market risk factors and systemic credit drivers as was described with reference to the risk factor module 92 of FIG. 6. However, the risk factor model module 98 is different in that, at each time step of the time horizon for the simulation, the risk factor model module 98 generates multiple samples of increment values $\Delta Z(t)$ 82 from a normal distribution having a mean of zero and a variance of $\Delta t$, where $\Delta t$ in the context of specifying the normal distribution is understood to multiply the K×K identity matrix when generating increments for K idiosyncratic credit risk factors. Each increment value $\Delta Z(t)$ 82 is added to the corresponding idiosyncratic credit risk factor sample $Z(t)$ 84 previously generated at the time step ending at time t, to obtain newly simulated idiosyncratic credit risk factor samples $Z(t+\Delta t)$ 93.

The multiple idiosyncratic credit risk factor samples $Z(t+\Delta t)$ 93 may be used with one joint market risk factor sample $X(t+\Delta t)$ 88 and systemic credit driver sample $Y(t+\Delta t)$ 90 to obtain multiple loss samples, one for each $Z(t+\Delta t)$ 93. Although the resultant loss samples are no longer independent as multiple loss samples are generated from the same market risk factor sample $X(t+\Delta t)$ 88 and systemic credit driver sample $Y(t+\Delta t)$ 90, they do nevertheless satisfy the weaker technical condition known as m-dependence.

Figure 9:
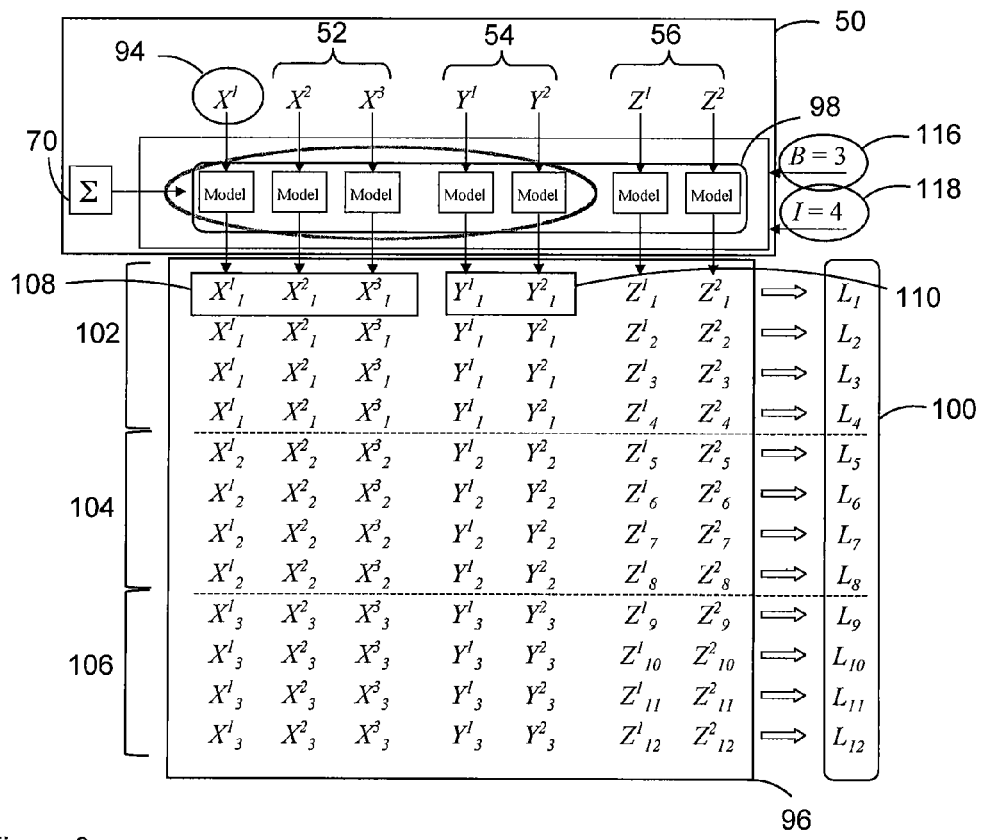
FIG. 9 shows an example block diagram illustrating example output of a risk factor sampling module comprising the risk factor model module of FIG. 8.

Referring now to FIG. 9, there is shown an example block diagram illustrating example output of a variant risk factor sampling module 50 comprising the risk factor model module 98 of FIG. 8, which implements the "two-tiered" approach. A resultant set of risk factor samples 96 generated by the risk factor sampling module 50 is shown. This resultant set of risk factor samples 96 may then be processed by, for example, loss sample computation module 24 (FIG. 3) to obtain N=12 loss samples 100 (e.g. $L_1$ to $L_{12}$ in this example).

It can be observed that, using this "two-tiered" approach, N=12 portfolio loss samples can be obtained by combining I=4 (118) idiosyncratic credit risk factor samples with each of B=3 (116) joint samples of market risk factors and systemic credit drivers. In this example, four idiosyncratic credit risk factor samples $Z(t+\Delta t)$ 93 are used with each given market risk factor sample $X(t+\Delta t)$ 88 and each systemic credit driver sample $Y(t+\Delta t)$ 90 (FIG. 8).

In this example, three groups 102, 104, 106 of sets of risk factor samples are generated. For each group, only one sample of a given market risk factor e.g. (94 $X^1$) and credit risk factor is generated, and is re-used when combined with one of four samples of the idiosyncratic credit risk factors, to generate four different sets of risk factor samples per group, in this example. Each set of risk factor samples can be used to calculate a loss sample, and accordingly, N=BI=12 loss samples can be generated by this approach in the example as shown.

More specifically, four loss samples ($L_1$ to $L_4$) are generated by, for example, loss sample computation module 24 (FIG. 3), from four risk factor scenarios defined of a first group 102, which comprises one sample for each market risk factor 108 ($X_1^1$, $X_1^2$, $X_1^3$), one sample for each systemic credit driver 110 ($Y_1^1$, $Y_1^2$), and four samples for each idiosyncratic credit risk factor, generated by risk factor sampling module 50. Similarly, four loss samples can be computed from risk factor scenarios defined by the risk factor samples of the second group 104, and also of the third group 106.

Referring back to FIG. 3, in accordance with "a two-tiered" approach, the loss sample computation module 24 may re-use the same simulated exposure table 38 generated from the same market risk factor sample in the first group (e.g. group 102), for calculating different loss samples, each based on a different one of I=4 idiosyncratic credit risk factor samples. It will be observed from the example that the number of required simulated exposure tables 38 to be generated is reduced by a factor of B (i.e. only one per B=3 distinct market risk factor samples) relative to the "simple sampling" approach, while still obtaining N=BI=12 loss samples 100.

Accordingly, use of the "two-tiered" approach typically results in a reduction in the number of distinct samples of market risk factors and systemic credit drivers required relative to the "simple sampling" approach (e.g. see FIG. 7) to provide the same number N of loss samples.

Figure 10:
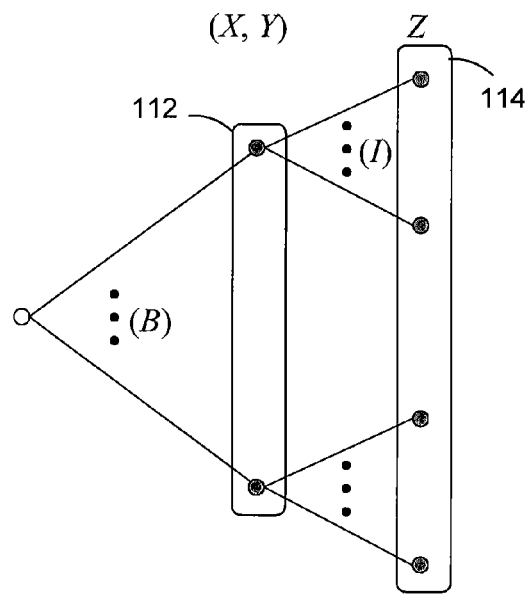
FIG. 10 shows an example graphical representation of the risk factor scenario structure underlying a resulting set of risk factor samples generated according to a known "two-tiered" approach to generating risk factor samples.

Referring now to FIG. 10, there is shown an example graphical representation of the risk factor scenario structure underlying the resulting set of risk factor samples 96 generated according to the "two-tiered" approach to generating risk factor samples. Scenarios represented by sets of risk factor samples can be viewed as a two-level tree, with the joint market risk factor and systemic credit driver samples (X,Y) 112 emanating from the root level, and the multiple idiosyncratic credit risk factor samples Z 114 branching out from each joint market risk factor and systemic credit driver sample (X,Y) 112 at the second branch level. This graphical representation of the risk factor scenarios further illustrates that only B distinct market risk factor samples (and systemic credit driver samples) must be generated. Specifically, each of B nodes in the first branch represents a distinct market risk factor sample (of the joint sample) which can be re-used for I different idiosyncratic credit risk factor samples. It will be observed that since only B distinct market risk factor samples (or B sets if multiple market risk factors are modeled), B corresponding simulated exposure tables need be generated by loss sample computation module 24.

The inventors realized, however, that although the "two-tiered" approach provides certain advantages over the "simple sampling" approach, a number of practical limitations may arise with the former approach in certain applications. For example, there may be a limit on the number of idiosyncratic credit risk factor samples that may be employed, i.e. the size of I. It may be observed that beyond a certain point, simply generating more idiosyncratic credit risk factor samples for each joint sample in the "two-tiered" approach as described above is no longer effective for improving the approximation of the loss distribution $\hat{F}$ for a given portfolio. In particular, if certain counterparties incur significant systemic credit risk (i.e., their eventual credit states depend largely on the systemic credit drivers), then a large number of samples of systemic credit drivers Y would be required in order to accurately approximate the right tail of the computed loss distribution (e.g. see FIG. 2). One may consider choosing a higher B so that a greater number of samples of Y may be obtained to improve the approximation of the loss distribution. However, recall that in the "two-tiered" approach, market risk factor samples and systemic credit driver samples are jointly simulated. Therefore, increasing the number of desired samples of systemic credit driver Y would in turn, necessitate an equal increase in the number of generated samples of market risk factor X. In computing loss samples, the number of simulated exposure tables will also increase accordingly. As previously noted, the act of generating simulated exposure tables is very computationally expensive.

The inventors also observed that the known "two-tiered" approach does not provide guidance on how a given selection of B and I might impact the quality of risk estimates calculated from a generated loss distribution. In practice, implementations of the "two-tiered" approach typically require B and I to be determined through trial and error.

Compound Risk Factor Sampling and Optimized Sampling Scheme

In accordance with at least one embodiment, a compound risk factor sampling approach is employed in systems and methods described herein. In one broad aspect, compound risk factor sampling is performed that generally comprises conditionally generating multiple samples of systemic credit driver Y for each sample of market risk factor X generated, at each time step of a time horizon for a simulation.

This approach may reduce the number of costly simulated exposure calculations (e.g. generated simulated exposure tables 38 of FIG. 3) required to obtain a desired number N of loss samples, compared to the known approaches described above. In another broad aspect, there is provided systems and methods configured to determine an optimal number of sample values for each of the market risk factors X, systemic credit drivers Y and idiosyncratic credit risk factors Z to be generated at each time step of a time horizon for a simulation, in order to obtain an acceptable amount of variability in one or more computed risk estimates, and/or to satisfy an available computational budget, such as a time constraint. This may generally eliminate the need to determine the optimal or otherwise desired number of risk factor samples by trial and error.

Compound Risk Factor Sampling

In at least one embodiment described herein, a compound risk factor sampling approach as described herein is used to generate an integrated market and credit loss distribution for the purpose of calculating one or more risk measures associated with a portfolio of instruments by performing a simulation.

A market risk factor process is denoted as $X(t)$, a systemic credit driver process as $Y(t)$, and an idiosyncratic credit risk factor process as $Z(t)$. In at least one embodiment, each of the processes are vector-valued, with $X(t)$ and $Y(t)$ indexed by the individual scalar risk factors and $Z(t)$ indexed by the counterparty names in the portfolio. The simulation is performed for at least one time horizon, wherein the time horizon comprises at least one time step. Let $t$ and $t+\Delta t$ be two consecutive simulation times.

For a compound risk factor sampling approach, the following assumptions are made:

Market risk factor $X(t)$ can be partitioned into at least one group of components with each group assigned a particular model.

Market risk factor $X(t)$ can be transformed via a bijective function, which will be referred to as $G(X(t))$. The function $G(X(t))$ may be allowed to depend on $t$ and $\Delta t$ but such dependence is suppressed in the following notation. The increment value $\Delta G(X(t)) \equiv EG(X(t+\Delta t))-G(X(t))$ is a (possibly time-dependent) bijective function of a centred normal random vector $\Xi(t)$, and will be referred to as $H_{t,\Delta t}(\Xi(t))$. $H_{t,\Delta t}$ may depend on $X(t)$ as well, and such a dependency will be expressed as $H_{t,\Delta t}(\Xi(t); X(t))$;

Models for each group within the market risk factor $X(t)$ that satisfy these assumptions include, for example: Brownian motions (with or without drift); Ornstein-Uhlenbeck processes; Hull-White processes; Geometric Brownian motions; and Black-Karasinski processes.

The corresponding functions G and H for a group can be represented as follows:

1.1. Brownian motion, possibly correlated $X(t+\Delta t)=X(t)+\Xi(t).$

The covariances for $\Xi(t)$ are set in the corresponding rows and columns of $\Sigma_{11}$.

$G(X)=X, H(\Xi(t))=\Xi(t).$ 1.2. Brownian motion with drift, possibly correlated $X(t+\Delta t)=X(t)+b(t)\Delta t+\Xi(t).$ where $b(t)$ is the instantaneous drift vector which is constant over the time step increment. The covariances for $\Xi(t)$ are set in the corresponding rows and columns of $\Sigma_{11}$.

$G(X)=X, H(\Xi(t))=b(t)\Delta t+\Xi(t).$ 1.3. Geometric Brownian motion, possibly correlated, with or without drift, with or without Itô correction $X(t+\Delta t)=X(t) \exp(u(t)\Delta t-(\delta/2)\sigma^2(t)+\Xi(t))$ where $u(t)$ is the instantaneous drift vector which is constant over the time step increment, and $\delta=1$ if the Itô correction is included and 0 otherwise. The covariances for $\Xi(t)$ are set in the corresponding rows and columns of $\Sigma_{11}$; $\sigma^2(t)$ is the vector of variances taken from the corresponding diagonal entries of $\Sigma_{11}$.

$G(X)=\log X, H(\Xi(t))=u(t)\Delta t-(\delta/2)\sigma^2(t)+\Xi(t).$ 1.4. Ornstein-Uhlenbeck process, with possible nonzero mean reverting level $X(t+\Delta t)=\bar{x}+e^{-a\Delta t}[X(t)-\bar{x}]+\Xi(t)$ where $\bar{x}$ is the vector of mean reverting levels and $a$ is the vector of mean reverting rates, both constant over the entire final horizon. The covariances for $\Xi(t)$ are set in the corresponding rows and columns of $\Sigma_{11}$ and are of the form $cov_{jk}[1-\exp\{-(a_j+a_k)\Delta t\}]/[a_j+a_k]$ for the (j,k)-th pair of components of $\Xi(t)$. Here $a_j$ and $a_k$ are the j-th and k-th components of $a$ respectively and $cov_{jk}$ is the instantaneous covariance of the underlying driving Brownian motions for the (j,k)-th pair of components of $\Xi(t)$, their instantaneous covariance being constant over the entire final horizon.

$G(X)=X, H(\Xi(t))=[1-e^{-a\Delta t}][\bar{x}-X(t)]+\Xi(t)$ where 1 denotes the vector with all components equal to 1.

1.5. Black-Karasinski process, with possible nonzero exponential mean reverting level $\log X(t+\Delta t)=\tilde{x}+e^{-a\Delta t}[\log X(t)-\tilde{x}]+\Xi(t)$ where $\tilde{x}$ is the vector of mean reverting levels and $a$ is the vector of mean reverting rates, both for the log process and both constant over the entire final horizon. The covariances for $\Xi(t)$ are set in the corresponding rows and columns of $\Sigma_{11}$ and are of the form $cov_{jk}[1-\exp\{-(a_j+a_k)\Delta t\}]/[a_j+a_k]$ for the (j,k)-th pair of components of Ξ(t). Here $a_j$ and $a_k$ are the j-th and k-th components of a respectively and $cov_{jk}$ is the instantaneous covariance of the underlying driving Brownian motions for the (j,k)-th pair of components of Ξ(t), their instantaneous covariance being constant over the entire final horizon.

$$G(X)=\log X, H(\Xi(t))=[1-e^{-a\Delta t}][\tilde{x}-\log X(t)]+\Xi(t)$$

where 1 denotes the vector with all components equal to 1.

Systemic credit driver Y(t) is a correlated Brownian motion (CBM). The increment value $\Delta Y(t) \equiv Y(t+\Delta t) - Y(t)$ is normally distributed with mean zero.

A random vector (Ξ(t), ΔY(t)) is conditional on (X(t), Y(t)) and is jointly normally distributed, having a covariance matrix Σ, where $$\Sigma \equiv \begin{bmatrix} \Sigma_{11} & \Sigma_{12} \\ \Sigma_{21} & \Sigma_{22} \end{bmatrix}.$$

Note that Σ will depend generally on t, Δt, X(t), Y(t) even though this dependence is suppressed in the notation.

Idiosyncratic credit risk factor Z(t) is a standard Brownian motion, which is independent of (X(t), Y(t)). The increment value $\Delta Z(t) \equiv Z(t+\Delta t) - Z(t)$ is normally distributed, N(0, Δt), and is independent of the random vector (Ξ(t), ΔY(t)).

Figure 11:
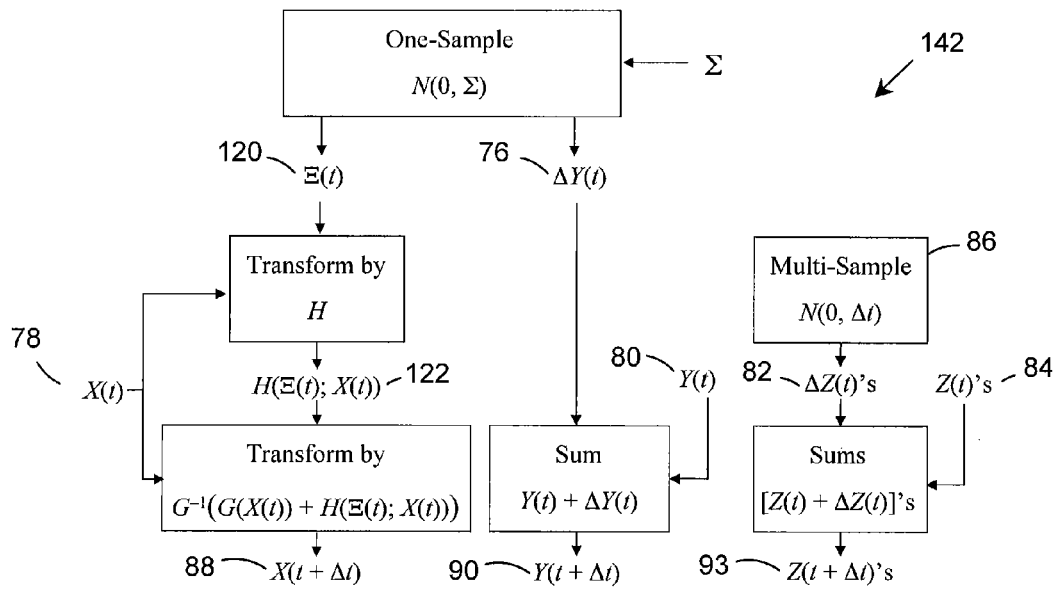
FIG. 11 shows an example block diagram illustrating how certain market risk factor models may be applied in a simulation performed in accordance with a known "two-tiered" approach.

Referring now to FIG. 11, there is shown, for comparative purposes, an example block diagram of a risk factor model module 142 illustrating how certain market risk factor models may be applied in a simulation performed in accordance with a known "two-tiered" approach.

In this simplified example, it may be observed that the risk factor model module 142 implements a "two-tiered" approach, since at the end of each time step t+Δt, a single market risk factor sample X(t+Δt) 88 and a single systemic credit driver sample Y(t+Δt) 90 are generated, along with multiple idiosyncratic credit risk factor samples Z(t+Δt) 93.

Figure 12:
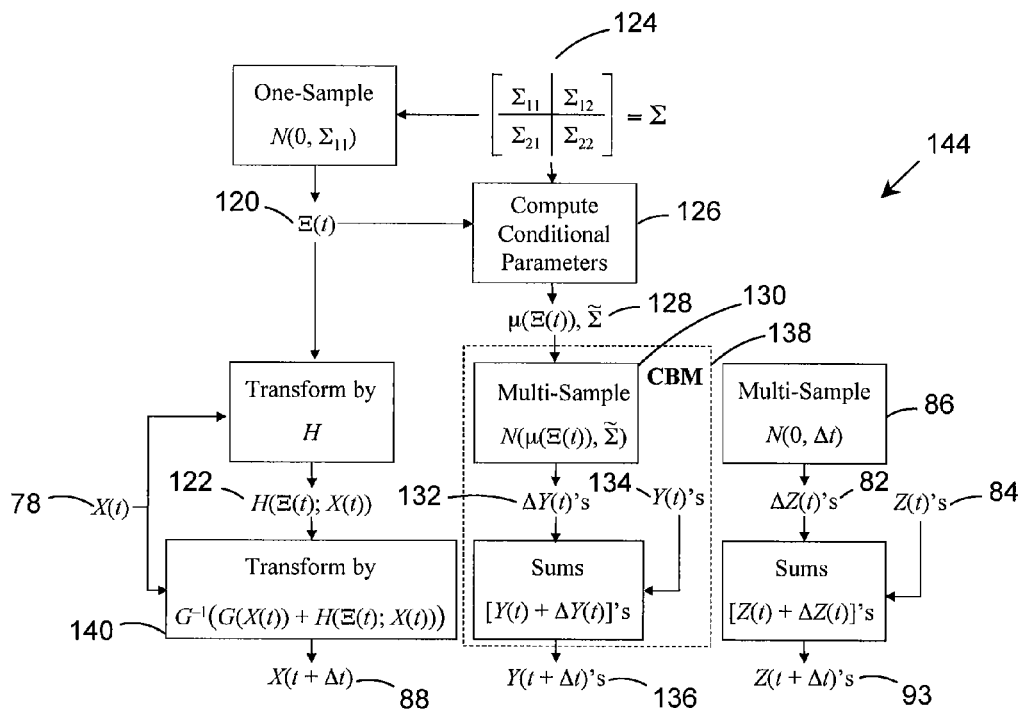
FIG. 12 shows an example block diagram of a risk factor model module for use in a risk factor sampling module implementing compound risk factor sampling in accordance with at least one embodiment.

Referring now to FIG. 12, there is shown an example block diagram of a risk factor model module 144 for generating risk factor samples for a time step ending at time t+Δt, for use in a risk factor simulation module implementing compound risk factor sampling in accordance with at least one embodiment.

As shown in FIG. 12, for a time step ending at time t+Δt, the risk factor model module 144 not only generates multiple idiosyncratic credit risk factor samples Z(t+Δt) 93, but also multiple systemic credit driver samples Y(t+Δt) 136, while only generating a single market risk factor sample X(t+Δt) 88. The risk factor model module 144 generates market risk factor samples and systemic credit driver samples in a manner that preserves their co-dependence. Specifically, the systemic credit driver samples Y(t+Δt)s 136 are generated conditionally on the market risk factor sample X(t+Δt) 88.

Generally, the risk factor model module 144 conditionally generates risk factor samples for the time step ending at time t+Δt, (i.e. samples X(t+Δt) 88, Y(t+Δt)s 136, and Z(t+Δt)s 93) by generating the increment values Ξ(t) 120, ΔY(t)s 132, and ΔZ(t)s 82 respectively, using the relations derived from the above assumptions:

$$X(t+\Delta t)=G^{-1}(G(X(t))+H_{t,\Delta t}(\Xi(t)))$$

$$Y(t+\Delta t)=Y(t)+\Delta Y(t)(\text{for each } Y(t))$$

$$Z(t+\Delta t)=Z(t)+\Delta Z(t)(\text{for each } Z(t)).$$

The risk factor model module 144 is provided with the predetermined co-variance matrix Σ 124 that defines the joint evolution of market risk factors and systemic credit drivers over time. In at least one embodiment, Σ 124 is a covariance matrix of a random vector (Ξ(t), ΔY(t)) that is conditional on X(t) and Y(t) and is jointly normally distributed.

The risk factor model module 144 generates a sample of a vector Ξ(t) 120 (as defined above) of normal random variables with a distribution $N(0,\Sigma_{11})$. This vector Ξ(t) 120 is used to obtain the market risk factor sample X(t+Δt) 88 and conditionally generate the systemic credit driver samples Y(t+Δt)s 136.

Specifically, the risk factor model module 144 obtains a market risk factor sample X(t+Δt) 88 by transforming the random vector Ξ(t) 120 via the above defined bijectve function $H_{t,\Delta t}$ conditional on the previously obtained (i.e. at the end of time step t) market risk factor sample X(t) 78. This results in the increment value ΔG(X(t)) 122 (i.e. H(Ξ(t); X(t))), where ΔG(X(t))≡G(X(t+Δt))−G(X(t)). A transformation module 140 may be configured to use the increment value ΔG(X(t)) 122 to obtain X(t+Δt) 88, since X(t+Δt)=$G^{-1}$(G(X(t))+H(Ξ(t); X(t))). The specific functions used for G and $H_{t,\Delta t}$ may depend on how the market risk factor process X is modeled. The market risk factor sample X(t+Δt) 88 is generated based on the sample of the vector Ξ(t) 120 of normal random variables, the model for the market risk factor process X, and a previous market risk factor sample X(t) 78 generated at the end of time step t.

The risk factor model module 144 generates systemic credit driver samples Y(t+Δt)s 136 conditionally on X(t), X(t+Δt), and Y(t), (or equivalently on X(t), Ξ(t), and Y(t)), by implementing a conditional parameters module 126 and a CBM model 138.

Given the random vector Ξ(t) 120 and the co-variance matrix Σ 124, a conditional parameters module 126 computes a conditional mean μ(Ξ(t)) and conditional co-variance matrix $\tilde{\Sigma}$ 128, where:

$$\mu(\Xi(t))=\Sigma_{21}\Sigma_{11}^{-1}\Xi(t)$$

$$\tilde{\Sigma}=\Sigma_{22}-\Sigma_{21}\Sigma_{11}^{-1}\Sigma_{12}.$$

In a case where $\Sigma_{11}$ is not invertible, then alternatively the conditional parameters module 126 may use, for example, a Moore-Penrose generalized inverse, $\Sigma_{11}^{+}$ in place of $\Sigma_{11}^{-1}$.

The conditional parameters 128 (μ(Ξ(t)) and $\tilde{\Sigma}$) are provided to the CBM model 138 for defining the multi-sample conditional distribution 130 for generating the multiple increment values ΔY(t)s 132. Specifically, the increment values ΔY(t)s 132 are generated from a multi-sample with the conditional normal distribution N(μ(Ξ(t)),$\tilde{\Sigma}$).

These increment values ΔY(t)s 132 are combined with multiple systemic credit driver samples Y(t)s 134 previously generated at the time step ending at time t. This results in multiple systemic credit driver samples Y(t+Δt)s 136 being conditionally generated on the market risk factor sample X(t+Δt) 88.

In addition, the risk factor model module 144 may independently generate multiple idiosyncratic credit risk factor samples Z(t+Δt)s 93, as generally described in relation to FIG. 8. However, note that multiple idiosyncratic credit risk factor samples Z(t+Δt)s 93 are generated for each market risk factor sample—systemic credit driver sample pair. Specifically, a set of/idiosyncratic credit risk factor samples Z(t+Δt)s 93 are generated for each of the S conditional systemic credit driver samples Y(t+Δt)s 136, per market risk factor sample X(t+Δt) 88. This is graphically illustrated in FIG. 15, and will be explained in further detail herein.

The risk factor model module 144 will repeat this process until the steps are performed for a given time step t+Δt that is the last time step of the time horizon. Although only one market risk factor sample is shown to be generated in this example, multiple market risk factor samples (M) may be generated at the end of each time step t+Δt, with the systemic credit driver samples generated conditionally on each of the market risk factor samples, as will be explained herein.

FIG. 12 illustrates how the discrete-time systemic credit driver process Y is generated incrementally, conditionally on the discrete-time market risk factor process X using $\Xi(t)$ 120 and $\Delta Y(t)$s 132. By repeatedly sampling the $N(\mu(\Xi(t)), \tilde{\Sigma})$ distribution to generate $\Delta Y(t)$s 132, multiple conditional systemic credit driver samples Y(t+Δt)s 136 are generated at the end of each time step t+Δt.

Illustrative Example

The risk factor model module 144 will be further illustrated with a simple example consisting of three risk factors: two market risk factors—an equity value Xe, following a Geometric Brownian Motion and a mean reverting interest rate $X_r$—and a single systemic credit driver Y, following a Brownian Motion:

$$dX_e = vX_e dt + \sigma_1 X_e dB_1$$

$$dX_r = a[\bar{x} - X_r]dt + \sigma_2 dB_2$$

$$dY = dB_3$$

where v is a constant growth rate, $\bar{x}$ is the constant mean reverting level, a is the rate of mean reversion, $\sigma_1, \sigma_2$ are instantaneous volatilities, and $(B_1, B_2, B_3)$ is a Brownian motion with instantaneous correlation matrix, $(\rho_{ij})_{1 \leq i,j \leq 3}$.

The solutions to these stochastic differential equations are given as $$\log X_e(t) = \log X_e(0) + \left[v - \frac{\sigma_1^2}{2}\right]t + \sigma_1 B_1(t)$$

$$X_r(t) = e^{-at}[X_r(0) - \bar{x}] + \bar{x} + \sigma_2 e^{-at} \int_0^t e^{as} dB_2(s)$$

$$Y(t) = Y(0) + B_3(t)$$

Moreover, the increments are given by $$\Delta \log X_e(t) = \left[v - \frac{\sigma_1^2}{2}\right]\Delta t + \sigma_1 \Delta B_1(t)$$

$$\Delta X_r(t) = [1 - e^{-a\Delta t}][\bar{x} - X_r(t)] + \sigma_2 e^{-a[t+\Delta t]} \int_t^{t+\Delta t} e^{as} dB_2(s)$$

$$\Delta Y(t) = \Delta B_3(t).$$

Thus we can set (with transposition of matrices denoted by a superscript, "'", and vectors represented as columns):

$$G(X_e, X_r) = (\log X_e, X_r)'$$

$$\Xi(t) = (\Xi_1(t), \Xi_2(t))' \equiv \left(\Delta B_1(t), e^{-a[t+\Delta t]} \int_t^{t+\Delta t} e^{as} dB_2(s)\right)'$$

$$H_{t,\Delta t}(\Xi) = \left(\left[v - \frac{\sigma_1^2}{2}\right]\Delta t + \sigma_1 \Xi_1, [1 - e^{-a\Delta t}][\bar{x} - X_r(t)] + \sigma_2 \Xi_2\right)'.$$

Indeed, $(\Xi_1(t), \Xi_2(t), \Delta Y(t))'$ is normally distributed with mean $(0,0,0)'$ because we can write it in the form $$\int_t^{t+\Delta t} A(s)(dB_1(s), dB_2(s), dB_3(s))'$$

for a deterministic matrix function A: $A(s)=\text{diag}(1, \exp(-a[t+\Delta t-s]), 1))$.

Using the well known result:

$$\mathbb{E}\left[\int_t^{t+\Delta t} \phi(s) dB_i(s) \int_t^{t+\Delta t} \psi(s) dB_j(s)\right] = \rho_{ij} \int_t^{t+\Delta t} \phi(s)\psi(s) ds$$

for deterministic integrands, $\phi$ and $\psi$, the covariance matrix $\Sigma$ 124 of $(\Xi_1(t), \Xi_2(t), \Delta Y(t))'$ is found to be $$\Sigma \equiv \begin{bmatrix} \Sigma_{11} & \Sigma_{12} \\ \Sigma_{21} & \Sigma_{22} \end{bmatrix} = \begin{bmatrix} \Delta t & \frac{\rho_{12}}{a}[1 - e^{-a\Delta t}] & \rho_{13}\Delta t \\ \frac{\rho_{12}}{a}[1 - e^{-a\Delta t}] & \frac{1}{2a}[1 - e^{-2a\Delta t}] & \frac{\rho_{23}}{a}[1 - e^{-a\Delta t}] \\ \rho_{13}\Delta t & \frac{\rho_{23}}{a}[1 - e^{-a\Delta t}] & \Delta t \end{bmatrix}.$$

Using these illustrative example results, the generation of risk factor samples at each given time step t+Δt (by e.g. risk factor model module 144) is reduced incrementally to that for $\Xi, \Delta Y, \Delta Z$, as described above in relation to FIG. 12.

Figure 13:
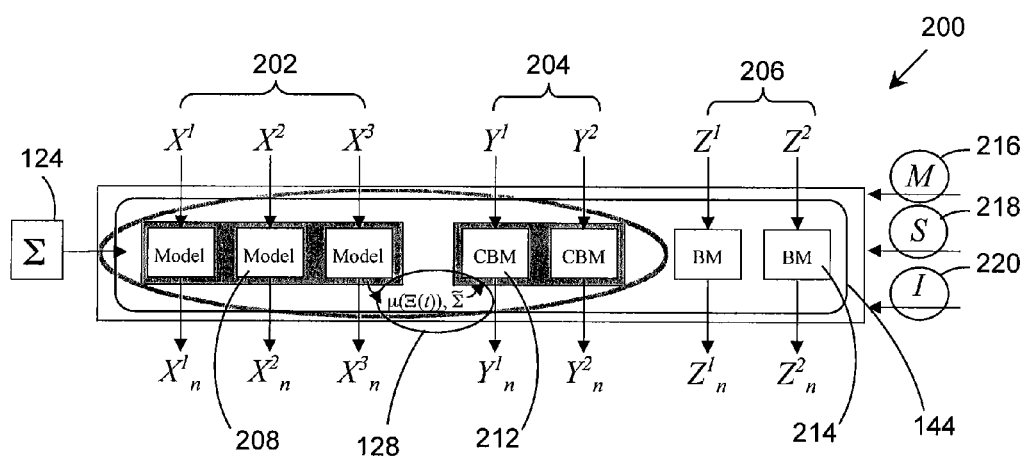
FIG. 13 shows an example block diagram of a risk factor sampling module comprising the risk factor model module of FIG. 12 in accordance with at least one embodiment.

Referring now to FIG. 13, there is shown an example block diagram of a compound risk factor sampling module 200 comprising the risk factor model module 144 of FIG. 12.

For illustrative purposes, the example compound risk factor sampling module 200 receives as input three market risk factor processes 202 ($X^1, X^2, X^3$), two systemic credit driver processes 204 ($Y^1, Y^2$), and two idiosyncratic credit risk factor processes 206 ($Z^1, Z^2$). The compound risk factor sampling module 200 also receives covariance matrix $\Sigma$ 124 (FIG. 12) as input, which is provided to the risk factor model module 144. Generally, the risk factor model module 144 conditionally generates multiple systemic credit driver samples on a given market risk factor sample, as generally described above in relation to FIG. 12.

The risk factor model module 144 implements at least one market risk factor model 208 for generating samples for at least one specified market risk factor. In this example, the risk factor model module 144 implements a risk factor model for each of the three market risk factors 202. The models for the market risk factor process may be any of the models described above, such as for example, Brownian motions (with or without drift); Ornstein-Uhlenbeck processes; Hull-White processes; Geometric Brownian motions; and Black-Karasinski processes.

An example market risk factor is $X^3$, and a market risk factor sample $X_n^3$ is generated by the risk factor model module 144.

The risk factor model module 144 further implements CBM models (e.g. CBM model 212) for generating systemic credit driver samples of the systemic credit driver processes 204, as is described in relation to CBM model 138 of FIG. 12. For example, samples for systemic credit driver $Y^1$ are generated according to CBM model 212, which functions similarly to CBM model 138. Specifically, CBM model 212 generates samples of systemic credit driver $Y^1$ conditionally on the market risk factor samples generated for the particular time step. This is achieved as described in relation to FIG. 12, and illustratively shown by the risk factor model module 144 passing the conditional parameters 128 ($\mu(\Xi(t))$ and $\tilde{\Sigma}$) from the market risk model 208 to the CBM model 212 for compound risk factor sampling.

Idiosyncratic credit risk factors 206 are modeled as Brownian motions. For example, samples for idiosyncratic credit risk factor $Z^1$ evolve as is described in relation to FIG. 8 by the risk factor model module 144 implementing idiosyncratic credit risk factor model 214.

The compound risk factor sampling module 200 further receives a sampling scheme, or a set of parameter values for M 216, S 218 and (optionally) I 220. These parameter values indicate the number M of market risk factor samples, the number S of systemic credit driver samples for each of the M market risk factor samples, and the number I of idiosyncratic credit risk factor samples for each of the S of systemic credit driver samples, that are to be generated at each time step of the simulation. Details of how these sample size values M, S, I may be optimally determined will be described herein in accordance with at least one embodiment.

The compound risk factor sampling module 200 uses the resulting set of risk factor samples in defining risk factor scenarios.

Figure 14A:
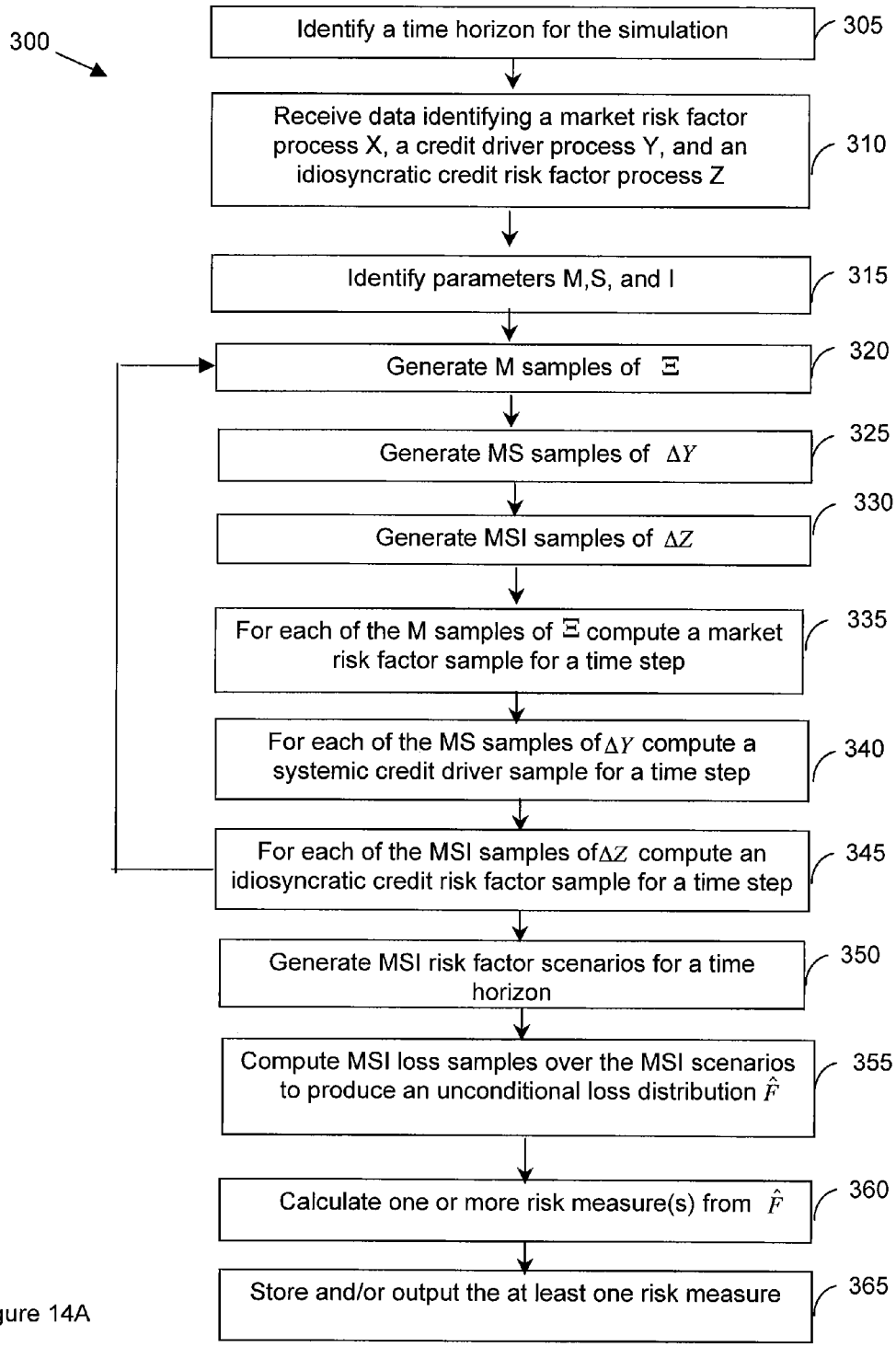
FIG. 14A shows a flowchart diagram illustrating acts in a method of generating one or more risk measures associated with a portfolio of instruments by performing a simulation in accordance with at least one embodiment.

Referring now to FIG. 14A, there is shown a flowchart diagram illustrating a computer-implemented method 300 for generating an integrated market and credit loss distribution for the purpose of calculating one or more risk measures associated with a portfolio of instruments by performing a simulation, in accordance with at least one embodiment described herein. The acts of the method 300 are performed by a computer comprising at least one processor and at least one memory.

At 305, at least a first time horizon for performing the simulation is identified. The time horizon comprises at least one time step, and may comprise a plurality of time steps. Furthermore, a simulation may be performed for multiple time horizons by repeatedly performing 320 to 365 in order to generate risk measures for each time horizon.

At 310, data identifying a market risk factor process X, a systemic credit driver process Y, and an idiosyncratic credit risk factor process Z is received as input. The market risk factor process X is a vector-valued process indexed by individual scalar risk factors, the systemic credit driver process Y is a vector-valued process indexed by individual scalar risk factors, and the idiosyncratic credit risk factor process Z is a vector-valued process indexed by counterparty names in the portfolio of instruments.

The data identifying processes X, Y, and Z comprises, for each process X, Y and Z, a start value or initial value, at least one function representing a model (i.e. Brownian Motions (with or without drift); Ornstein-Uhlenbeck processes; Hull-White processes; Geometric Brownian Motions; Black-Karasinski processes), and zero or more parameters for the model associated with the respective process.

In addition, at 310, data comprising one or more co-variance matrices (e.g. Σ 1124) is received. As described above, the one or more co-variance matrices define the joint evolution of X and Y over the first time horizon. If the time horizon comprises multiple time steps, one of the one or more co-variance matrices is associated with each of the time steps, and accordingly, defines the joint evolution of X and Y over the respective time step.

At 315, a first parameter M, a second parameter S, and a third parameter I are identified. These parameter values define a compound risk factor sampling scheme. Specifically, M defines a desired number of market risk factor samples, S defines a desired number of systemic credit driver samples that are to be generated for each of M market risk factor samples, and I defines a desired number of idiosyncratic credit risk factor samples to be generated for each of S systemic credit driver samples. Accordingly, the sampling scheme will define the desired number of risk factor samples for the time horizon. More particularly, M is a value greater than 0, S is a value greater than 1, and I is a value greater than 0, in at least one embodiment. As shown in FIG. 13, for example, the parameter values M 216, S 218, and I 220 are provided to the compound risk factor sampling module 200 to generate MSI risk factor scenarios.

Generally, acts 320 to 350 relate to the generation of N=MSI risk factor scenarios for the time horizon. However, if the time horizon contains multiple time steps, then acts 320 to 345 are repeated until the end of the given time step is also the end of the time horizon identified at 305. In one example embodiment, the time horizon has two time steps, such that acts 320 and 345 will be repeated twice, in generating the N scenarios for the time horizon.

For ease of reference, the following indexing scheme will be used to refer to particular risk factor samples:

$X_m$ is the m-th of the M market risk factor samples;

$Y_{ms}$ is the s-th of the S systemic credit driver samples occurring with market risk factor sample $X_m$; and $Z_{msi}$ is the i-th of the/idiosyncratic credit risk factor samples occurring with market risk factor sample $X_m$ and systemic credit driver sample $Y_{ms}$.

The N=MSI scenarios are defined by N sets of X, Y, and Z values $(X_m, Y_{ms}, Z_{msi})$ for all m from 1 to M, for all s from 1 to S, and for all i from 1 to I. In one example embodiment, these N scenarios for the time horizon will be generated after performing acts 320 to 345 twice, once for each time step. Acts 320 and 345 will be described generally with reference to a given time step.

At 320, for each m from 1 to M, a sample, having index m, of a vector Ξ(t) (e.g. Ξ(t) 120 of FIG. 12) of centred normal random variables is generated.

At 325, for each m from 1 to M and for each s from 1 to S, a random sample, having index ms, of ΔY(t) from a conditional distribution $N(\mu(\Xi(t)), \tilde{\Sigma})$ is generated. The conditional distribution is derived from the sample of the vector Ξ(t) having index m, and from the one or more co-variance matrices received at 310. Again if the time horizon contains multiple time steps, then the co-variance matrix used is the one associated with the given time step. As shown in FIG. 12, the co-variance matrix is used to derive the conditional covariance matrix $\tilde{\Sigma}$ used for the above defined distribution of Y. This results in MS samples for the increment ΔY(t).

At 330, for each m from 1 to M and for each s from 1 to S and for each i from 1 to I, a random sample, having index msi, of an increment of Z (ΔZ) is independently generated. The generation of the samples for ΔZ is generally as is described in relation to FIGS. 8 and 12 above. This results in MSI samples for the increment ΔZ.

At 335, for each of the M samples of the vector Ξ(t), a market risk factor sample $X_m$, $m \in \{1, 2, \ldots, M\}$, is calculated for a given time step using the sample having the index m for the vector Ξ(t). The market risk factor sample $X_m$ is calculated as is generally described in relation to FIG. 12. That is, $X_m = X(t+\Delta t) = G^{-1}(G(X(t)) + H(\Xi(t); X(t)))$, for the mth sample of the vector Ξ(t), where the end of the given time step is t+Δt. The market risk factor samples are generated based on the at least one function associated with X (i.e. the given model which is used to define G and H) and the market risk factor sample obtained at the previous time step (i.e. X(t)). If the given time step is the first time step of the time horizon, then the previous market risk factor sample is the start value received at 310. This results in the generation of M market risk factor samples $X_m$ for $m \in \{1, 2, \ldots, M\}$ for the given time step.

At 340, for each of the MS samples of ΔY(t), a systemic credit driver sample $Y_{ms}$, $m \in \{1, 2, \ldots, M\}$, and $s \in \{1, 2, \ldots, S\}$, is calculated for a given time step using the ms-th sample of ΔY(t). The systemic credit driver sample $Y_{ms}$ is calculated as is generally described in relation to FIG. 12. Systemic credit driver samples are based on the function associated with Y and the systemic credit driver samples obtained at the previous time step (i.e. Y(t)). If the given time step is the first time step of the time horizon, then each of the previous systemic credit driver samples is the start value received at 310. This results in the generation MS systemic credit driver samples $Y_{ms}$, for m ∈ {1, 2, ..., M}, and s ∈ {1, 2, ..., S}, for the given time step. That is, S systemic credit driver samples $Y_{ms}$ are generated conditionally on each of the M market risk factor samples $X_m$.

At 345, for each of the MSI samples for ΔZ, an idiosyncratic credit risk factor sample $Z_{msi}$, m ∈ {1, 2, ..., M}, s ∈ {1, 2, ..., S}, and i ∈ {1, 2, ..., I}, is calculated for a given time step using the msi-th sample of ΔZ. The idiosyncratic credit risk factor sample $Z_{msi}$ is calculated as is generally described in relation to FIGS. 8 and 12. That is, idiosyncratic credit risk factor samples are based on the function associated with Z and the idiosyncratic credit risk factor samples obtained at the previous time step (i.e. Z(t)). If the given time step is the first time step of the time horizon, then each of the previous idiosyncratic credit risk factor samples is the start value received at 310. This results in MSI idiosyncratic credit risk factor samples, for m ∈ {1, 2, ..., M}, s ∈ {1, 2, ..., S}, and i ∈ {1, 2, ..., I}. That is, I idiosyncratic credit risk factor samples $Z_{msi}$ are generated for each of the generated S systemic credit driver samples $Y_{ms}$.

If the end of the given time step is not the end of the time horizon, then steps 320 to 345 are repeated for the next time step. This may result in the generation of intermediary market risk factor samples, systemic credit driver samples, and idiosyncratic credit risk factor samples, which may be stored in at least one memory and/or at least one storage device.

At 350, N=MSI risk factor scenarios are generated for the time horizon. The N scenarios are defined by N sets of X, Y, and Z values ($X_m, Y_{ms}, Z_{msi}$) for all m from 1 to M, for all s from 1 to S, and for all i from 1 to I. Note that the values ($X_m, Y_{ms}, Z_{msi}$) are the samples for a given time step, with the end of the given time step equal to the end of the time horizon. Put another way, the scenarios generated at 350 in at least one embodiment are a result of a simulation performed over the time horizon.

Figure 15:
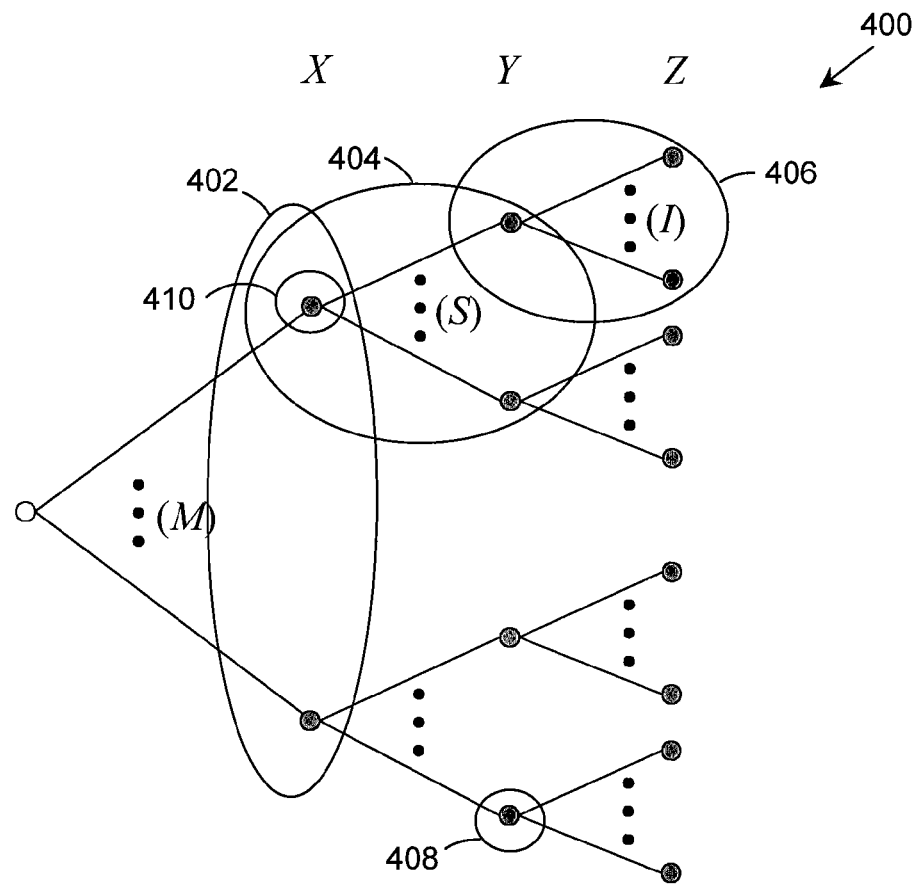
FIG. 15 shows an example graphical representation of the risk factor scenario structure underlying a resulting set of risk factor samples generated according to compound risk factor sampling in accordance with at least one embodiment.

Referring now to FIG. 15, there is shown a graphical representation of the resulting set of risk factor scenarios. Specifically, the resulting set of risk factor scenarios may be illustrated as a three-level regular unrooted tree. Each node (e.g. node 408) on the tree indicates a risk factor sample. A set of samples of market risk factor X (such as e.g. set 402), the set being of size M, is shown as the first level of the tree.

Then, for each market risk factor sample X., where m ∈ {1, 2, ..., M} (e.g. node 410) there are S conditional samples of systemic credit driver Y generated (such as e.g. set 404). This results in a total set of systemic credit driver samples of size MS, or ($Y_{m1}, ..., Y_{ms}$) for each m ∈ {1, 2, ..., M} (i.e. S samples of Y per sample of X) and is shown as the second level of the tree.

For each of the market risk factor samples m ∈ {1, 2, ..., M} and a corresponding systemic credit driver sample from the generated systemic credit driver samples s ∈ {1, 2, ..., S}, there are I idiosyncratic credit risk factor samples generated (such as e.g. set 406). This results in a total set of idiosyncratic credit risk factor samples of size MSI (i.e. I samples per MS market risk factor—systemic credit driver sample) and is shown as the third level of the tree.

Referring back to FIG. 14A, at 355, N=MSI simulated loss samples are computed by simulating the portfolio over the N risk factor scenarios over the time horizon. The simulated loss samples may generally be computed as described in relation to FIG. 3, using the N sets of X, Y, and Z values for all m from 1 to M, for all s from 1 to S, and for all i from 1 to I that define the N risk factor scenarios. For compound risk factor sampling, only M separate simulated exposure tables (e.g. table 38) are generated by, for example, the pricing module 36 (i.e. a simulated exposure table for each distinct market risk factor sample) in order to provide N=MSI loss samples. In contrast, following the "two-tiered" approach, MS exposure tables would have been calculated, and in the "simple sampling" or "brute force" approach, MSI exposure tables would have been calculated.

Each of the N=MSI loss samples may be denoted as $L(X_m, Y_{ms}, Z_{msi})$, in respect of a given m, s and i. Using the N=MSI loss samples, the empirical unconditional loss distribution function $\hat{F}$ may be obtained. The distribution may also be stored. For any loss value l then $\hat{F}(l)$ is the proportion of the simulated loss samples which are less than or equal to a given value l where:

$$\hat{F}(l) = \frac{1}{MSI}\sum_{m=1}^{M}\sum_{s=1}^{S}\sum_{i=1}^{I} 1\{L(X_m, Y_{ms}, Z_{msi}) \le l\}$$

where 1{ ... } is the indicator of the event in braces, taking the value 1 if the event occurs, or 0 if the event does not occur.

The empirical unconditional loss distribution function $\hat{F}$ may then be used to calculate one or more risk measures, which may be used for evaluating risk associated with the portfolio.

Accordingly, at 360, at least one risk measure for the portfolio is calculated from one or more characteristics of the empirical unconditional loss distribution $\hat{F}$. For example, a risk measure may be one of: a mean, a variance, a value at risk equaling a specified p-quantile, an unexpected loss equalling a specified p-quantile, and an expected shortfall equaling a specified p-quantile as previously defined.

At 365, the at least one risk measure calculated at 360 is stored and/or output for use in evaluating the risk associated with the portfolio.

In the "two-tiered" approach, joint samples of market risk factors and systemic credit driver samples are taken in a manner that accounts for the correlation between changes in market risk factors and systemic credit drivers. For a desired number of distinct systemic credit driver samples (e.g. an increased number relative to other risk factors may be desired to accurately approximate the loss distribution for certain portfolios), generation of joint samples will require that a corresponding market risk factor sample be generated for each systemic credit driver sample. This also holds for a "simple sampling" approach.

Accordingly, when it is considered necessary to generate a large number of distinct systemic credit driver samples, a correspondingly large size M of distinct market risk factor samples is also generated when computing sample losses. Computing sample losses for an increased number of distinct market risk factor samples may increase cost (e.g. is computationally expensive) much more significantly relative to the increase in cost when the number of distinct systemic credit driver samples and/or the number of distinct idiosyncratic credit risk factor samples is increased. This may be due in part to, for example, the increase in the number of derivative positions of a portfolio, which must be valued for each of the distinct market risk factor samples generated.

In contrast, with a compound risk factor sampling approach, it becomes possible to sample market risk factors and systemic credit drivers in a manner that allows the number of distinct market risk factor samples (i.e. M) and the number of distinct systemic credit driver samples (i.e. MS) in generated scenarios to be different. Accordingly, an increase in the number of distinct systemic credit driver samples does not require a corresponding increase in the number of distinct market risk factor samples required.

At least one embodiment described herein, as described with reference to FIG. 14A for example, relates to a specific implementation of a system and method that not only allows the number of distinct market risk factor samples (i.e. M) and the number of distinct systemic credit driver samples (i.e. MS) in generated scenarios to be different, but also further ensures that risk factor samples are generated consistent with the correlation between changes in market risk factors and systemic credit drivers.

Further Variant Embodiments

Embodiments of the method 300 described with reference to FIG. 14A may be generally regarded as describing a pure Monte Carlo (MC) approach, in that random sampling is carried out in all three "tiers" in the performance of sequence of method acts. In particular, at 330 of FIG. 14A, the increment ΔZ was randomly sampled, for use at 345, in generating idiosyncratic credit risk factor samples. However, sampling of the idiosyncratic credit risk factor Z is not essential, and the empirical unconditional loss distribution $\hat{F}$ may be determined in alternative ways. For example, in variant embodiments, an analytic valuation or approximation may be employed to determine each of a number of conditional loss distributions $F_{X_m,Y_{ms}}$, which may in turn be used to compute the empirical unconditional loss distribution $\hat{F}$.

The above formula for the empirical unconditional loss distribution $\hat{F}$ may be rearranged to:

$$\hat{F}(l) = \frac{1}{MSI}\sum_{m=1}^{M}\sum_{s=1}^{S}\sum_{i=1}^{I} 1\{L(X_m, Y_{ms}, Z_{msi}) \le l\} \equiv \frac{1}{MS}\sum_{m=1}^{M}\sum_{s=1}^{S} F_{X_m,Y_{ms}}(l)$$

$F_{X_m,Y_{ms}}$ denotes an empirical conditional loss distribution function, conditional on the market risk factor—systemic credit driver scenario $X_m,Y_{ms}$. In a pure MC approach (as described with reference to FIG. 14A), the conditional loss distribution function $F_{X_m,Y_{ms}}$ is:

$$F_{X_m,Y_{ms}}(l) = \frac{1}{I}\sum_{i=1}^{I} 1\{L(X_m, Y_{ms}, Z_{msi}) \le l\}$$

where 1{ . . . } is the indicator of the event in braces, taking the value 1 if the event occurs, or 0 if the event doesn't occur.

Figure 14B:
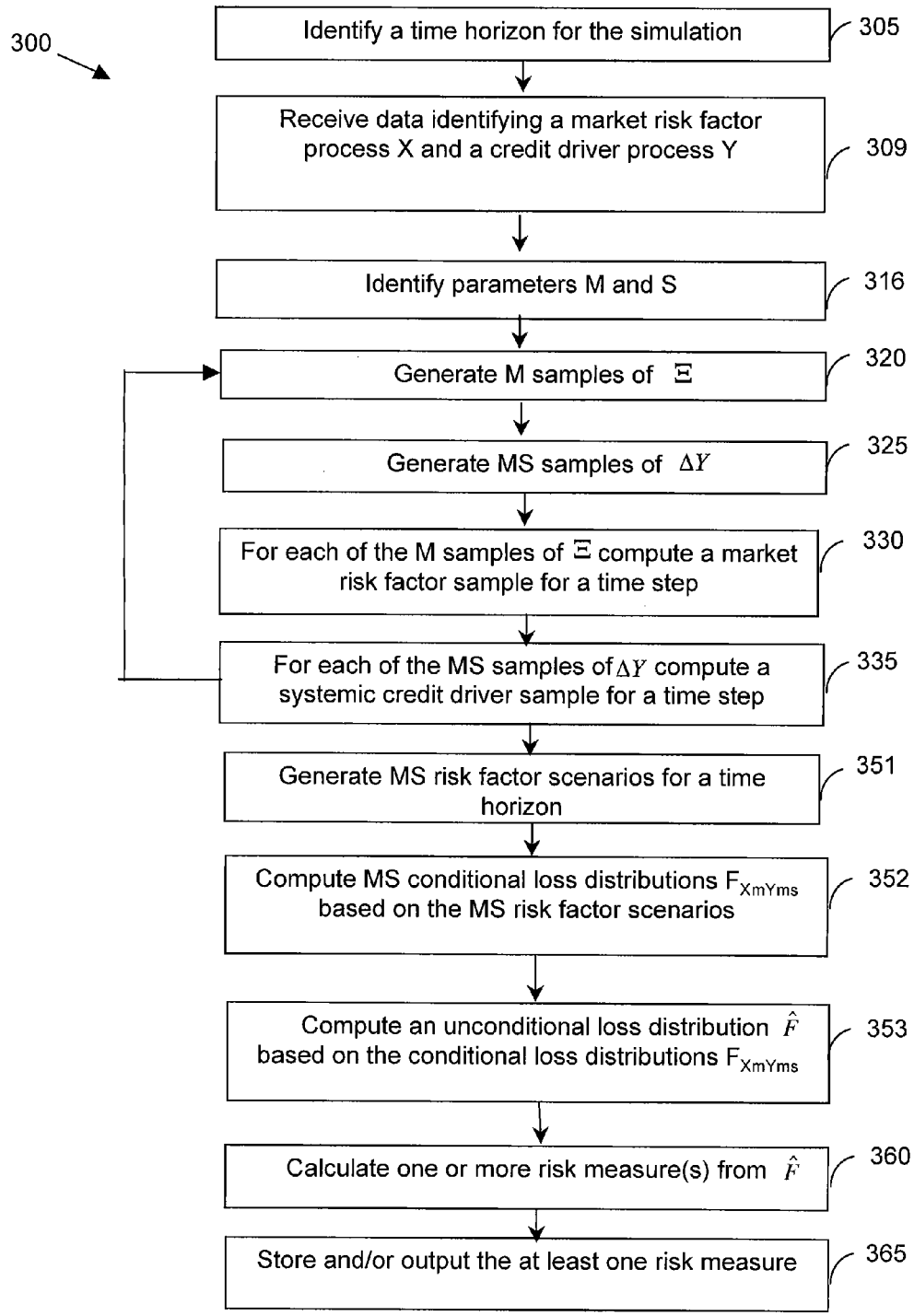
FIG. 14B shows a flowchart diagram illustrating acts in a method of generating one or more risk measures associated with a portfolio of instruments by performing a simulation in accordance with at least one other embodiment.

In a variant embodiment, an analytic valuation or approximation for $F_{X_m,Y_{ms}}$ might be available and may be used, as described further with reference to FIG. 14B.

Referring now to FIG. 14B, there is shown a flowchart diagram illustrating a computer-implemented method 300 for generating an integrated market and credit loss distribution for the purpose of calculating one or more risk measures associated with a portfolio of instruments by performing a simulation, in accordance with at least one variant embodiment.

Act 305 is generally as is described in relation to FIG. 14A. Further, act 309 is similar to the act performed at 310 of FIG. 14A, except that only data identifying a market risk factor process X, and a systemic credit driver process Y, is received as input. More particularly, data identifying an idiosyncratic credit risk factor process Z is not required. Accordingly, act 316 is similar to the act performed at 315 of FIG. 14A, except that only parameter values for M and S are identified.

Acts 320 to 351 are similar to acts 320 to 350 of FIG. 14A, except that only MS risk factor scenarios are generated for the time horizon, and accordingly acts 330 and 345 described with reference to FIG. 14A are essentially eliminated in this at least one variant embodiment. In respect of embodiments described with reference to FIG. 14B, the MS scenarios are defined by MS sets of X and Y values $(X_m,Y_{ms})$ for all m from 1 to M, and for all s from 1 to S.

At act 352, for each of the MS scenarios defined by MS sets of X and Y values $(X_m,Y_{ms})$ for all m from 1 to M, and for all s from 1 to S, a conditional loss distribution $F_{X_m,Y_{ms}}$ is analytically derived. This results in the generation of MS conditional loss distributions $F_{X_m,Y_{ms}}$ for the first time horizon.

As previously noted, in at least one variant embodiment, an analytic valuation or approximation for $F_{X_m,Y_{ms}}$ is used. For example, each empirical conditional loss distribution $F_{X_m,Y_{ms}}$ may be approximated according to one of a number of analytic techniques, such as the Law of Large Numbers (LLN) or Central Limit Theorem (CLT), if the portfolio is sufficiently large and fine grained. The notion of fine granularity in finance is that no counterparty (or small number of counterparties) contributes an overwhelming amount to the loss distribution. In more general contexts of mathematical statistics, this is known as uniform infinitesimality. This is justified by the conditional independence of the counterparties of the portfolio, conditional on a given market risk factor sample and systemic credit driver sample pair.

Alternatively, by the same independence property, the conditional loss distributions $F_{X_m,Y_{ms}}$ can be calculated as the convolution of all the individual counterparty's loss distributions, for example, using the Fast Fourier Transform (FFT) after discretizing the loss values onto a common lattice.

Accordingly, by way of example, the following methods may be employed to calculate the conditional loss distributions, $F_{X_m,Y_{ms}}$ at 352:

LLN
CLT
convolution via FFT

At 353, the unconditional loss distribution $\hat{F}$ is calculated as a mixture i (e.g. the mean) of the MS conditional loss distributions, such that:

$$\hat{F} = \frac{1}{MS}\sum_{m=1}^{M}\sum_{s=1}^{S} F_{X_m,Y_{ms}}$$

Finally, acts 360 and 365 are generally as described with reference to FIG. 14A.

Figure 14C:
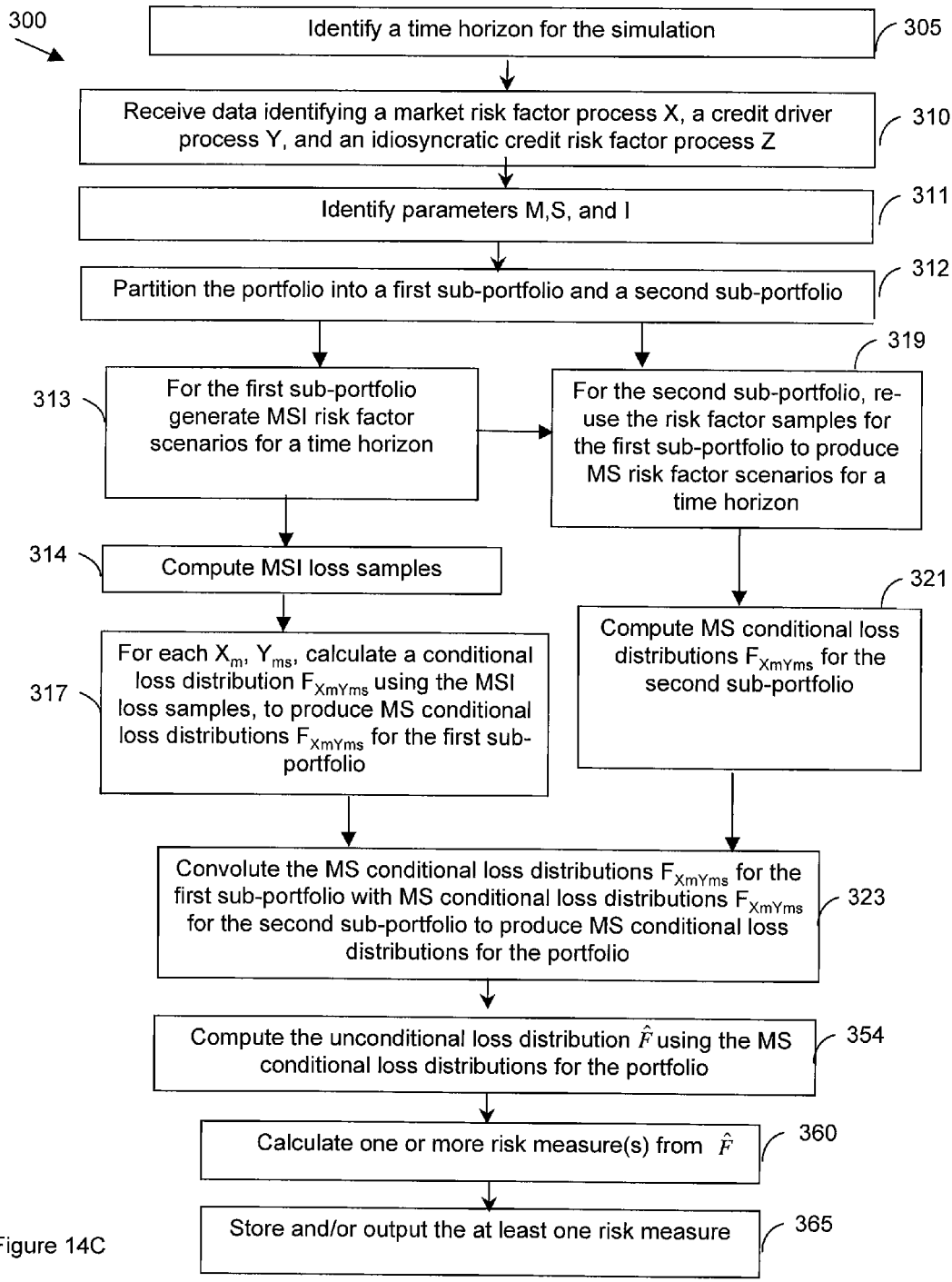
FIG. 14C shows a flowchart diagram illustrating acts in a method of generating one or more risk measures associated with a portfolio of instruments by performing a simulation in accordance with at least one other embodiment.

Referring now to FIG. 14C, there is shown a flowchart diagram illustrating a computer-implemented method 300 for generating an integrated market and credit loss distribution for the purpose of calculating one or more risk measures associated with a portfolio of instruments by performing a simulation, in accordance with at least one variant embodiment described herein.

Embodiments of method 300 as described in FIG. 14C relates to a "hybrid" of the embodiments generally described with reference to FIGS. 14A and 14B. Generally, in the hybrid case, which may be regarded as a combination of an MC technique employed in embodiments described with reference to FIG. 14A and an analytic technique employed in embodiments described with reference to FIG. 14B, the portfolio is partitioned into several non-overlapping sub-portfolios, in each of which, a distinct method is used to calculate the conditional loss distributions $F_{X_m, Y_{ms}}$. In particular, an MC technique is used to determine the conditional loss distributions for at least a first sub-portfolio, and an analytic approach is used to determine the conditional loss distributions for at least a second sub-portfolio. The resulting conditional loss distributions are convoluted together, for example, using FFT.

In FIG. 14C, acts 305, 310 and 311 are as generally described with reference to acts 305, 310, and 315 of FIG. 14A.

At 312, the portfolio of interest is partitioned into a first sub-portfolio and a second sub-portfolio. Only two sub-portfolios are shown for ease of explanation, however, it will be understood that the portfolio may be partitioned into more than two non-overlapping groups in variant embodiments. Generally for each of the sub-portfolios, MS empirical conditional loss distributions are calculated using any of the previously identified methods, for example. These may include, for example, MC, LLN, CLT and convolution via FFT. By way of illustration, FIG. 14C will be described with respect to an embodiment wherein the MS empirical conditional loss distributions for the first sub-portfolio are calculated via MC, and the MS empirical conditional loss distributions for the second sub-portfolio are calculated via an analytic technique (e.g. one of LLN, CLT and convolution via FFT).

At 313, for the first sub-portfolio, MSI risk factor scenarios for the time horizon are generated. The MSI risk factor scenarios may be generated by, for example, performing the acts 315 to 350 as described with reference to FIG. 14A, for the first sub-portfolio. The MSI scenarios for the first sub-portfolio are defined by N sets of X, Y, and Z values $(X_m, Y_{ms}, Z_{msi})$ for all m from 1 to M, for all s from 1 to S, and for all i from 1 to I. $X_m$, $Y_{ms}$, and $Z_{msi}$ for all m from 1 to M, for all s from 1 to S, and for all i from 1 to I comprise the risk factor samples generated for the first sub-portfolio, generated at 335, 340, and 345 of FIG. 14A, for example.

At 314, MSI simulated loss samples for the first sub-portfolio are computed by simulating the first sub-portfolio over the MSI risk factor scenarios. The simulated loss samples may be generally computed as described with reference to FIG. 3, using the MSI sets of X, Y, and Z values $(X_m, Y_{ms}, Z_{msi})$ for all m from 1 to M, for all s from 1 to S, and for all i from 1 to I that define the N=MSI risk factor scenarios. The N=MSI loss samples may be denoted as $L(X_m, Y_{ms}, Z_{msi})$.

At 317, for each m ∈ {1, 2, . . . , M} and s ∈ {1, 2, . . . , S}, an empirical conditional loss distribution function, $F_{X_m, Y_{ms}}$, is calculated based on the simulated loss samples, $L(X_m, Y_{ms}, Z_{msi})$. For any loss value, l, $F_{X_m, Y_{ms}}(l)$ is the proportion of the simulated loss values which are less than or equal to a given value, l; viz.

$$F_{X_m, Y_{ms}}(l) = \frac{1}{I} \sum_{i=1}^{I} 1\{L(X_m, Y_{ms}, Z_{msi}) \le l\}$$

where 1{ . . . } is the indicator of the event in braces, taking the value 1 if the event occurs, or 0 if the event doesn't occur.

This results in MS conditional loss distribution functions $F_{X_m, Y_{ms}}^{P1}$, for each m from 1 to M and each s from 1 to S, for the first sub-portfolio.

At 319, the risk factor samples obtained in relation to the first sub-portfolio are re-used in the processing of the second sub-portfolio to produce MS risk factor scenarios for the second sub-portfolio. Specifically, MS risk factor scenarios for the second sub-portfolio are defined by MS sets of X and Y values $(X_m, Y_{ms})$ for all m from 1 to M, and for all s from 1 to S obtained for the first sub-portfolio.

At 321, the act performed at 352 as generally described with reference to FIG. 14B is performed to analytically derive a conditional loss distribution for each of the MS risk factor scenarios for the second sub-portfolio. This results in the generation of MS conditional loss distributions $F_{X_m, Y_{ms}}^{P2}$, for each m from 1 to M and each s from 1 to S, for the second sub-portfolio.

At 323, the MS conditional loss distributions $F_{X_m, Y_{ms}}^{P1}$ generated at 317 for the first sub-portfolio are convoluted via FFT with the MS conditional loss distributions $F_{X_m, Y_{ms}}^{P2}$ generated at 321 for the second sub-portfolio. More specifically, for each m from 1 to M and each s from 1 to S, MS empirical conditional loss distributions $F_{X_m, Y_{ms}}$ are calculated for the portfolio by convoluting, for example via FFT, the ms-th conditional loss distribution $F_{X_m, Y_{ms}}^{P1}$ for said first sub-portfolio with the ms-th conditional loss distribution $F_{X_m, Y_{ms}}^{P2}$ for said second sub-portfolio.

At act 354, the unconditional loss distribution $\hat{F}$ for the portfolio is calculated as a mixture (e.g. a mean) of the MS conditional loss distributions, such that:

$$\hat{F} = \frac{1}{MS} \sum_{m=1}^{M} \sum_{s=1}^{S} F_{X_m, Y_{ms}}$$

Acts 360 and 365 are performed as generally described with reference to FIGS. 14A and 14B.

Sample Size Determination

In another broad aspect, systems and methods to facilitate the selection of appropriate risk factor sample size values (e.g. M, S and optionally I) are provided. In at least one embodiment, appropriate values can be automatically selected given a set of performance requirements.

For example, in the context of embodiments described herein with reference to FIGS. 14A through 14C, optimal values for M, S and I can be computed to be provided as the parameters identified at act 315 of FIG. 14A and act 311 of FIG. 14C. Similarly, optimal values computed for M and S may also be provided as the parameters identified at 316 of FIG. 14B.

The primary performance criterion is the variability of the resulting estimates of the one or more risk measures obtained from the empirical loss distribution $\hat{F}$. Examples of risk measures may include, without limitation: a mean, a variance, a value at risk equalling a specified p-quantile, an unexpected loss comprising a value at risk equalling a specified p-quantile less a mean, and an expected shortfall comprising an expected value of losses that exceed a specified p-quantile as previously defined.

The VaR $l_p$ (the pth quantile) of the loss distribution $\hat{F}$ can be estimated from N loss samples by the empirical p-quantile $\hat{l}_p$, which is defined as:

$$\hat{l}_p = L_{\lfloor Np \rfloor + 1)}$$

where $L_{(k)}$ is the kth order statistic, i.e., the kth smallest value of the N loss samples.

For example, if N=100 then the 97.5 percentile (p=0.975) is estimated by the kth order statistic (i.e. $L_{(k)}$ where $k=\lfloor 97.5 \rfloor+1=98$. In this example, the 97.5 percentile is estimated by the third largest loss of the N loss samples.

As the size N of loss samples becomes large, the sample quantile $\hat{l}_p$ of an m-dependent sequence has variance $\mathrm{Var}(\hat{l}_p)$ defined as follows:

$$\mathrm{Var}(\hat{l}_p) = \frac{\mathrm{Var}(\hat{F}(l_p))}{f(l_p)^2}$$

where f is the probability density of the loss distribution.

Using the Law of Total (Conditional) Variance, it can be shown that:

$$\mathrm{Var}(\hat{F}(l_p)) = \frac{v_1^0}{M} + \frac{v_2^0}{MS} + \frac{v_3^0}{MSI}$$

for appropriate coefficients $v_1^0$, $v_2^0$ and $v_3^0$.

Defining $\mathrm{Var}(\hat{F}(l_p)) \equiv \rho^2$, the following variance decomposition result is obtained.

Proposition 1 There are nonnegative constants, $v_1^0$, $v_2^0$, $v_3^0$, which do not depend on M, S, I, such that $$\sigma^2 = \frac{v_1^0}{M} + \frac{v_2^0}{MS} + \frac{v_3^0}{MSI}. \tag{1}$$

It will be understood that the last term is absent for embodiments applying a pure analytic technique (see e.g. FIG. 14B). For all cases—i.e. pure MC (see e.g. FIG. 14A), pure analytic (see e.g. FIG. 14B), or analytic-MC hybrid (see e.g. FIG. 14C)—the coefficients $v_1^0$, $v_2^0$ are defined as:

$$v_1^0 = \mathrm{Var}(E[F_{X,Y}(l_p)|X]), v_2^0 = E[\mathrm{Var}(F_{X,Y}(l_p)|X)],$$

the expression for $v_3^0$ depending on the particular technique.

For a pure MC method, the term I); is defined as:

$$v_3^0 = p - E[\{F_{X,Y}(l_p)\}^2].$$

The term $v_3^0$ is not applicable for the pure analytic method.

For an analytic-MC hybrid method, let $F_{X,Y}^A$ denote the conditional loss distribution for the part of the portfolio using analytic methods and let $F_{X,Y}^{MC}$ denote the conditional loss distribution for the part of the portfolio using the MC method. Thus $F_{X,Y} = F_{X,Y}^A * F_{X,Y}^{MC}$ where * is a convolution of cumulative distribution functions such that $F_{X,Y}^A * F_{X,Y}^{MC}(l) = \int F_{X,Y}^A(l-l') d F_{X,Y}^{MC}(l')$.

Then, in a hybrid case, the term $v_3^0$ is defined as:

$$v_3^0 = E[((F_{X,Y}^A)^2 * F_{X,Y}^{MC})(l_p)] - E[\{F_{X,Y}(l_p)\}^2]$$

where $(F_{X,Y}^A)$ is treated as a cumulative distribution function and * again denotes the convolution of cumulative distribution functions.

Formally, the analytic case is just the MC case with I set to ∞.

Therefore, the variance of the estimated p-quantile (i.e. the estimated VaR) is related to the risk factor sample sizes as follows $$\mathrm{Var}(\hat{l}_p) = \frac{1}{f(l_p)^2}\left(\frac{v_1^0}{M} + \frac{v_2^0}{MS} + \frac{v_3^0}{MSI}\right) \tag{2a}$$

In practice, the values of the coefficients $v_1^0$, $v_2^0$, $v_3^0$ and the density $f(l_p)$ are estimated from an initial pilot simulation with M, S and I chosen to be large.

Once these values have been obtained (e.g. by a pilot simulation module 545 of FIG. 16), Equation 2a can be used to determine parameters M, S and/that will provide quantile estimates with the predetermined level of precision (e.g. an acceptable level for the given application) on a regular basis.

In summary, determining a desired sampling scheme generally involves identifying an acceptable variance level for a risk measure, and computing a variance of estimates of said selected one risk measure. Finally M, S and I are determined such that said variance is within said acceptable variance level.

For example, if the risk estimate is the VaR, then the variance of that particular risk measure may be computed using Equation 2a. Then M, S and I are determined such that the variance of the estimated VaR is within an acceptable tolerance level.

As a further example, the mean of the loss distribution can be estimated from N=MSI sampled losses by the sample mean $$\hat{\mu} = \frac{1}{MSI}\sum_{m=1}^{M}\sum_{s=1}^{S}\sum_{i=1}^{I} L(X_m, Y_{ms}, Z_{msi})$$

Similar to the estimated p-quantile, the variance of the sample mean can be expressed as:

$$\mathrm{Var}(\hat{\mu}) = \frac{v_1^0}{M} + \frac{v_2^0}{MS} + \frac{v_3^0}{MSI} \tag{2b}$$

for appropriate coefficients $v_1^0$, $v_2^0$ and $v_3^0$. In this case, the coefficients are given by $$v_1^0 = \mathrm{Var}(E[L(X,Y,Z)|X]),$$

$$v_2^0 = E[\mathrm{Var}(\Lambda(X,Y)|X)] \text{ where } \Lambda(X,Y) = E[L(X,Y,Z)|X,Y]$$

and $$v_3^0 = E[\mathrm{Var}(L(X,Y,Z)|X,Y)]$$

If the MS conditional loss distributions $F_{X_m,Y_{ms}}$ are obtained analytically, then the mean loss is estimated as the average of their respective means, i.e., $$\hat{\mu} = \frac{1}{MS}\sum_{m=1}^{M}\sum_{s=1}^{S}\hat{\mu}_{ms}$$

where $\hat{\mu}_{ms} \equiv \Lambda(X,Y)$ using the notation above. In this case, the values of $v_1^0$ and $v_2^0$ are the same as for the sample mean while $v_3^0=0$.

As noted previously, in practice the number of risk factor samples that can be generated may be limited by computational resource and/or time constraints. For example, since banks typically assess risk on a daily basis, there may be an 8-hour window for completing the simulation. It is possible to use an expression for the variance of the desired estimator (e.g. Equation 2a or 2b, for risk measure VaR and mean respectively) in conjunction with such constraints to obtain an optimal sampling scheme (e.g. a set of sample sizes M, S and I) that minimizes the variability of risk estimates while satisfying constraints on resources and/or time.

Suppose that a time window of length T is available for the simulation and that the processing times for the various types of risk factor samples are:
- $c_M$ for each market risk factor sample
- $c_S$ for each systemic credit risk driver sample
- $c_I$ for each idiosyncratic credit risk factor sample These processing times may be received as input (e.g. via input module 540) and/or obtained or computed otherwise prior to determining the sampling scheme.

The optimal sampling scheme may be obtained by solving the following optimization problem:

$$\min_{M,S,I} \frac{v_1^0}{M} + \frac{v_2^0}{MS} + \frac{v_3^0}{MSI} \quad (3a)$$

s.t.

$$c_M M + c_S MS + c_I MSI \leq T$$
$$M \geq 1$$
$$S \geq 1$$
$$I \geq 1.$$

If no sampling of Z is performed, as is the case with analytic methods (see e.g. FIG. 14B), then the optimization problem simplifies to $$\min_{M,S} \frac{v_1^0}{M} + \frac{v_2^0}{MS} \quad (3b)$$

s.t.

$$c_M M + c_S MS \leq T$$
$$M \geq 1$$
$$S \geq 1.$$

Figure 16:
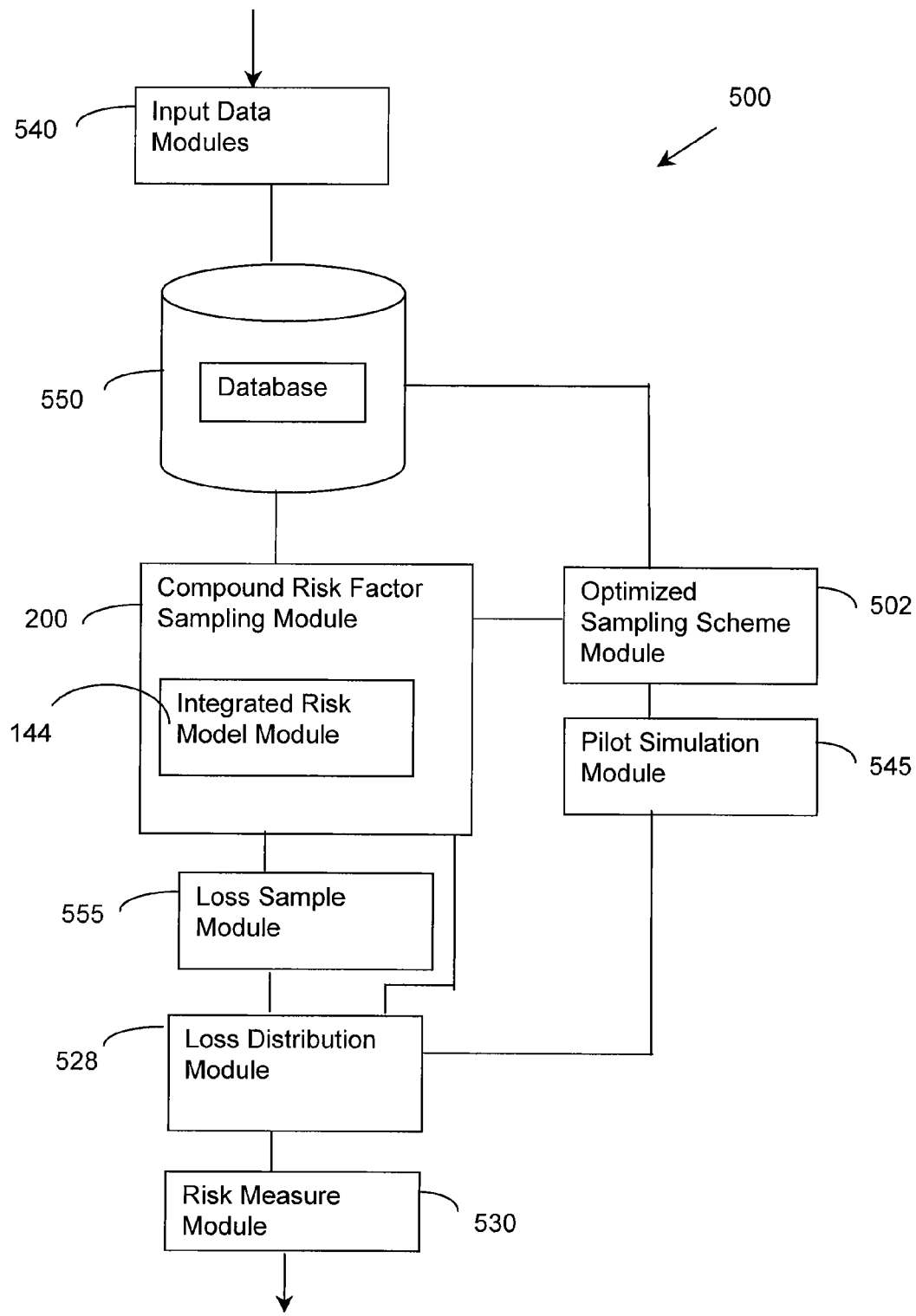
FIG. 16 shows an example block diagram of a risk factor simulation system for implementing compound risk factor sampling in accordance with at least one embodiment.
Figure 17:
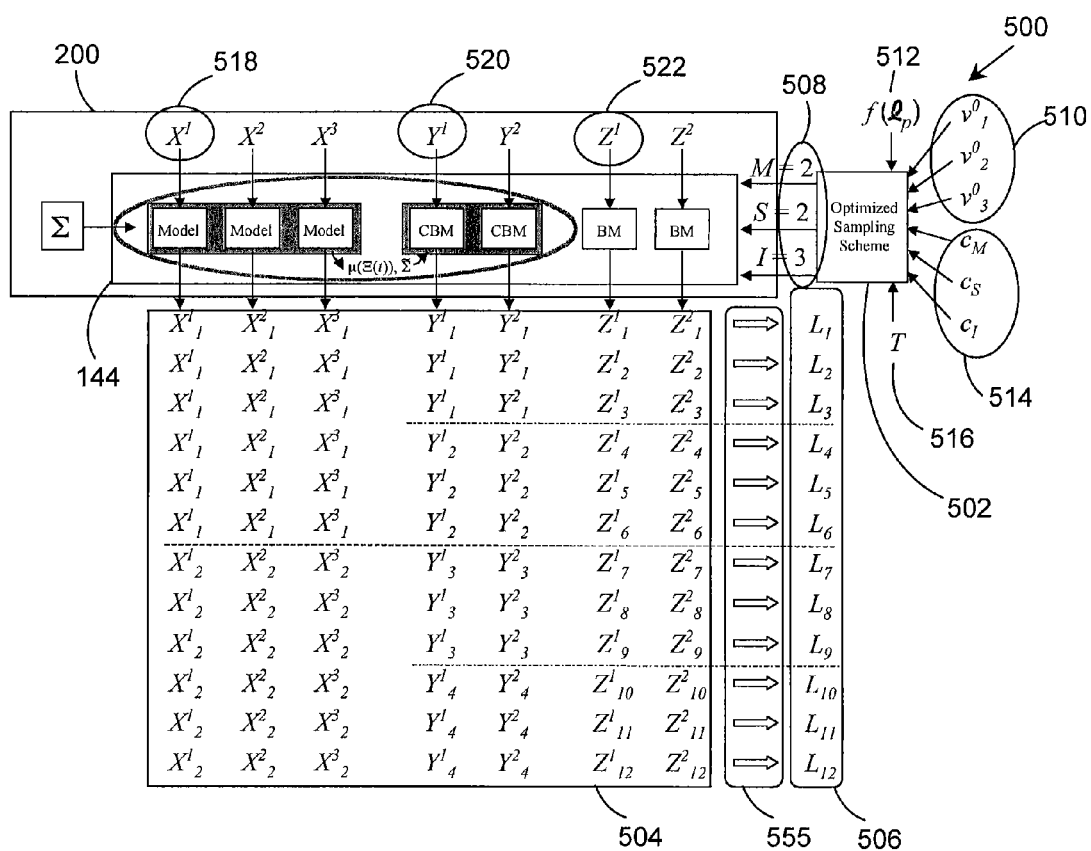
FIG. 17 shows another example block diagram illustrating outputs of a risk factor simulation system for implementing compound risk factor sampling in accordance with at least one embodiment.

Referring now to FIG. 16, there is shown an example diagram of a risk factor simulation system 500 implementing a compound risk factor sampling approach and configured to determine an optimized sampling scheme in accordance with at least one embodiment. The system 500 may be implemented as computer hardware and/or software applications that comprise a set of integrated components in modular form. Referring also to FIG. 17, there is shown another example diagram of a system 500 including a set of generated risk factor samples 504 that define risk factor scenarios.

Risk factor simulation system 500 generally comprises input data modules 540 to support the loading and managing of large amounts of information obtained from various data sources as input (i.e. internal applications, internal data sources, external data sources, market sources, instrument sources). Input data modules may receive data identifying a market risk factor process X, a systemic credit driver process Y, and an idiosyncratic credit risk factor process Z, for example. Again, X may be a vector-valued process indexed by individual scalar risk factors, Y may be a vector-valued process indexed by individual scalar risk factors, and Z may be a vector-valued process indexed by counterparty names in the portfolio of instruments. The data identifying processes X, Y, and Z comprises, for each process X, Y and Z, a start value, at least one function representing a model, and zero or more parameters for the model associated with the respective process.

Input data modules 540 may also receive data comprising one or more co-variance matrices that define the joint evolution of X and Y over the first time horizon, or over a given time step in the event the time horizon comprises multiple time steps.

Input data modules 540 may also receive data indicating a predetermined time period T over which to perform the risk factor simulation (e.g. time T 516 of FIG. 17), which may provide for a computational constraint (e.g. a time within which the simulation is required to be performed). In addition, the input data modules 540 may receive data indicating the processing times (e.g. processing times 514 of FIG. 17) required for generating a risk factor sample for each of the various types of risk factor samples. The input modules 540 may also receive data indicating a performance constraint indicating an acceptable level of variability for the obtained risk measure (e.g. VaR).

The data received by input data modules 540 may be stored in, for example, a database 550 (internal or external), which may be implemented using one or more memories and/or storage devices, for access by other system 500 modules. In addition, other data generated and/or utilized by the system 500 modules may be stored in database 550 for subsequent retrieval and use.

The risk factor simulation system 500 further comprises an initial pilot simulation module 545 for estimating values for coefficients $v_1^0, v_2^0, v_3^0$ and the probability density of the loss distribution $f(l_p)$ 512. The initial pilot simulation module 545 selects large values for M, S and I and runs an initial pilot simulation using the system 500 to obtain the pilot simulation loss distribution $\hat{F}$. The coefficients $v_1^0, v_2^0, v_3^0$ 510 and the density $f(l_p)$ 512 are then estimated from the pilot simulation loss distribution $\hat{F}$.

The main components of risk factor simulation system 500 (FIG. 16) comprise an optimized sampling scheme module 502 and a compound risk factor sampling module 200 (FIG. 13).

The optimized sampling scheme module 502 receives the initially estimated coefficients $v_1^0, v_2^0, v_3^0$ 510 and the density $f(l_p)$ 512 from initial pilot simulation module 545. The optimized sampling scheme module 502 may also receive additional data, for example, from database 550 or input module 540, such as the time T 516 available for performing the simulation and the processing times $c_M, c_S, c_I$ 514 for generating each of the risk factor samples.

The optimized sampling scheme module 502 is configured to solve one or more predefined optimization problems, such as e.g. Equation 3a, to compute parameters for the optimal sampling scheme (M, S, I) 508. Other optimization problems relating M, S, and (optionally) I to the variability of the selected risk measure(s) may alternatively be implemented in variant embodiments.

For example, in the event that an analytic technique is used to derive the unconditional loss distribution, such as is described with reference to FIG. 14B, alternatively the optimization module 502 may determine an optimal sampling scheme (M,S) by implementing e.g. Equation 3b.

In addition, the optimization module 502 may receive other performance related data, such as a performance level parameter indicating a required maximum level of variability for one or more risk measures. The optimization module 502 may use such data to identify a maximum acceptable variance level for at least a selected one risk measure.

The optimization module 502 is configured to compute a variance of estimates of the selected one risk measure, as described herein. Finally, the optimization module 502 determines values for M, S and, optionally, I, such that the variance is within the acceptable variance level (e.g. by evaluating Equation 2a and/or 2b).

Further, the optimization module 502 may be configured to evaluate equations 2a and/or 2b in conjunction with solving an optimization problem (e.g. 3a and/or 3b) to obtain an optimal sampling scheme 508 that provides an acceptable level of variability as indicated by a specified performance level. For example, for p=0.999, then $Var(\hat{l}_p)$, the variance of the p-quantile (or VaR), provided by Equations 2a may be required to be at least equal to (if not lower than) the specified performance level considered acceptable.

For illustration purposes, in this example, optimized sampling scheme module 502 (FIG. 17) computes an optimal sampling scheme 508, represented by M=2, S=2, and I=3.

The optimized sampling scheme module 502 provides data identifying the optimal sampling scheme 508 to the compound risk factor sampling module 200. The compound risk factor sampling module 200 generally implements, for example, acts 320 to 350 of FIG. 14A to generate MSI risk factor scenarios defined by the resulting set of the risk factor samples, in the illustrated example. The compound risk factor sampling module 200 comprises a risk factor model module 144 (FIGS. 12 and 13), for generating the compound risk factor samples 504 used by the compound risk factor sampling module 200 to define the MSI risk factor scenarios. It will be understood that the risk factor model module 144 may implement any or all of the market risk factor models, the systemic credit driver CBM models, and the idiosyncratic credit risk factor models described herein for compound risk factor sampling.

Referring to FIG. 17, the resulting set of risk factor samples 504 that define the risk factor scenarios is illustrated. The resulting set of risk factor samples 504 comprises M=2 distinct market risk factor samples for each of the 3 market risk factors X, MS=4 distinct systemic credit driver samples (conditioned on the market risk factors) for each of the 2 systemic credit drivers Y, and MSI=12 idiosyncratic credit risk factor samples for each of the 2 idiosyncratic credit risk factors Z. The compound risk factor sampling module 200 produces MSI risk factor scenarios using the resulting set of risk factor samples 504. Each row of the resulting set of risk factor samples 504 constitutes a risk factor scenario, for MSI scenarios in total.

Comparing the risk factor samples 504 illustrated in detail in FIG. 17, with the risk factor samples 96 of FIG. 9 (the "two-tiered" approach) and the risk factor samples 59 of FIG. 7 (the "simple-sampling" approach), it is shown that the compound risk factor sampling module 200 reduces the number of distinct market risk factor samples generated, while keeping the resultant number N=12 of risk factor scenarios and simulated loss samples 100/506 the same. Furthermore, in this example of FIG. 17, it can be seen that compound risk factor sampling module 144 generates a larger number of distinct systemic credit driver samples (e.g. 4 in FIG. 17 versus 3 in FIG. 9), while requiring a smaller number of distinct market risk factor samples (e.g. 2 in FIG. 17 versus 3 in FIG. 9) and hence a smaller number of simulated exposure tables that would need to be computed to generate the same number of loss samples.

Figure 18:
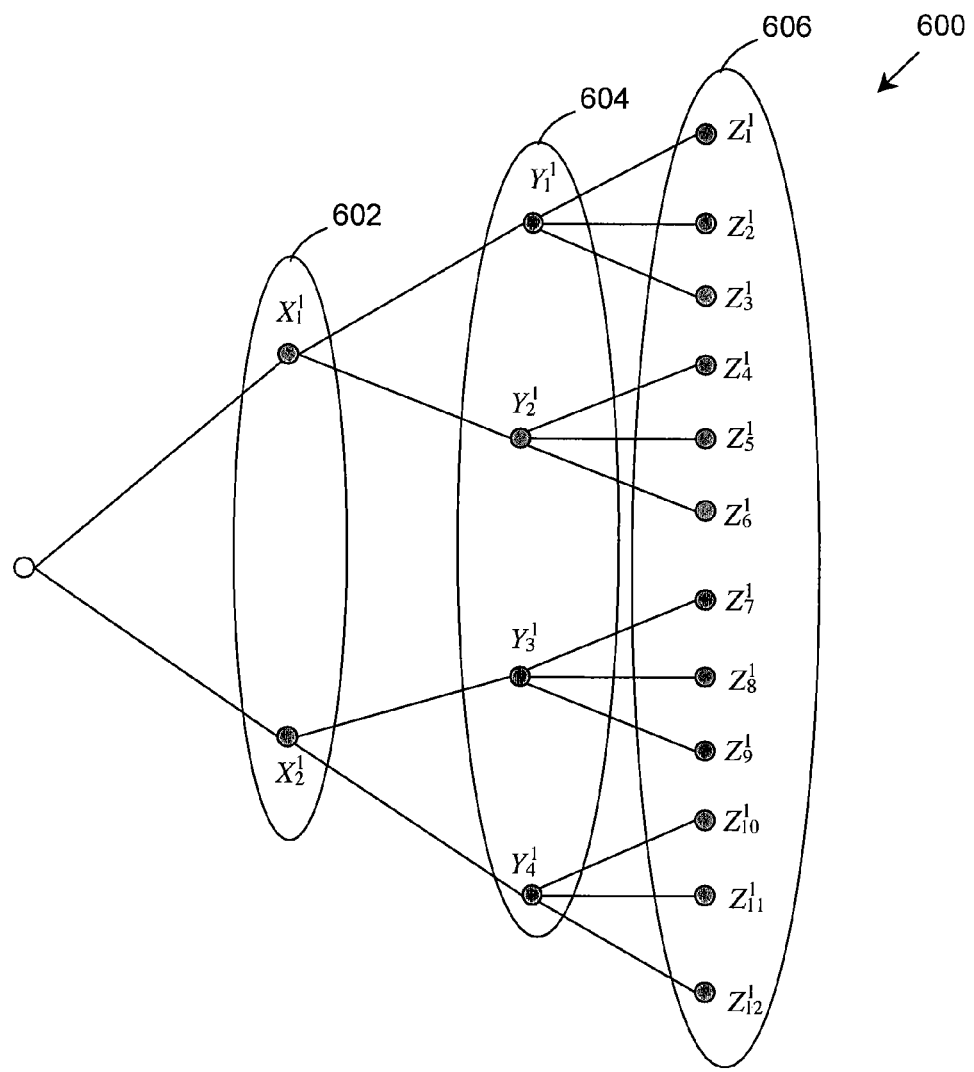
FIG. 18 shows another example graphical representation of the risk factor scenario structure underlying a resulting set of risk factor samples generated according to compound risk factor sampling in accordance with at least one embodiment.

Referring to FIG. 18, there is shown a simplified graphical representation 600 of three risk factors, i.e. a market risk factor $X^1$ 518, a systemic credit driver $Y^1$ 520, and an idiosyncratic credit risk factor $Z^1$ 522, making up a subset of the resulting compound risk factor sample 504 that is generated by the compound risk factor sampling module 200 according to the optimal sampling scheme 508.

Specifically, the three risk factor subset of the compound risk factor sample 504 is illustrated as a three level tree (as in FIG. 15), with M=2 market risk factor samples 602, MS=4 total systemic credit driver samples 604 (i.e. S=2 systemic credit driver samples for each of the M=2 market risk factor samples), and MSI=12 total idiosyncratic credit risk factor samples 606 (i.e. I=3 idiosyncratic credit risk factor samples for each of the MS=4 market risk factor sample—systemic credit driver sample pairs).

Referring back to FIGS. 16 and 17, the risk factor samples 504 that define the risk factor scenarios may be provided to a loss sample module 555 for use in obtaining MSI=N=12 portfolio loss samples 506. The loss sample module 555 may function generally as is described with reference to the loss sample module 24 of FIG. 3. Generally, the loss sample module 555 may be configured to use the market risk factor samples for pricing the instruments of the portfolio and calculating exposure tables (one per M market risk factor samples). The systemic credit driver samples and idiosyncratic credit risk factor samples are used to determine the simulated credit states for the counterparties by computing a creditworthiness index.

The MSI=N=12 simulated loss samples 506 may then be provided to a loss distribution module 528. The loss distribution module 528 may be configured to determine an empirical unconditional loss distribution $\hat{F}$ based on the simulated loss samples 506, as may be generally described with reference to act 355 of FIG. 14A.

Alternatively, the compound sampling module 200 may provide MS risk factor scenarios (defined by the set of risk factor samples) directly to the loss distribution module 528. The loss distribution module 528 may be configured to perform acts 352 and 353 of FIG. 14B in order to generate the empirical unconditional loss distribution $\hat{F}$.

Further, in the event the portfolio is partitioned into two sub-portfolios for example (as is described in relation to FIG. 14C), the loss distribution module 528 may receive a hybrid of MSI loss samples for a first sub-portfolio from the loss sample module 555, and MS risk factor scenarios for a second sub-portfolio. The loss distribution module 528 may be configured to perform acts 317, 321, 323 and 354 of FIG. 14C to generate the empirical unconditional loss distribution $\hat{F}$.

Finally, a risk measure module 530 is configured to determine at least one risk measure using at least one characteristic of the approximate loss distribution. Example risk measures may include, without limitation: the mean, the variance, the VaR (the p-quantile), unexpected loss, and expected shortfall. The one or more computed risk measures may be used to evaluate risk associated with the portfolio of interest, which integrates credit and market risk. The risk measure may be stored (in e.g. database 550) and/or output by the risk factor simulation system 500, for further use.

The compound risk factor sampling scheme described herein may be extended to encompass other portfolio risk model variations, in variant embodiments.

What has been described herein is merely illustrative of a number of example embodiments. Other configurations, variations, and arrangements to the systems and methods may be implemented by those skilled in the art without departing from the spirit and scope of the embodiments described herein as defined in the amended claims.

The invention claimed is:

1. A computer-implemented method for generating an integrated market and credit loss distribution for the purpose of calculating one or more risk measures associated with a portfolio of instruments by performing a simulation, wherein acts of said method are performed by computer, said computer comprising at least one computer processor and at least one memory, said method comprising:

identifying, by the at least one computer processor, at least a first time horizon for said simulation;

receiving, by the at least one computer processor, data identifying X, wherein X is a vector of scalar-valued market risk factor processes, each market risk factor process defined by a start value, at least one function representing a model, and zero or more parameters for the model;

receiving, by the at least one computer processor, data identifying Y, wherein Y is a vector of scalar-valued systemic credit driver processes, each systemic credit driver process defined by a start value, at least one function representing a model, and zero or more parameters for the model;

receiving, by the at least one computer processor, data identifying Z, wherein Z is a vector of scalar-valued idiosyncratic credit risk factor processes indexed by counterparty name, each idiosyncratic credit risk factor process defined by a start value, at least one function representing a model, and zero or more parameters for the model;

receiving, by the at least one computer processor, data comprising one or more co-variance matrices that define the joint evolution of X and Y over said first time horizon;

identifying, by the at least one computer processor, a first parameter M wherein M>0, a second parameter S wherein S>1, and a third parameter I wherein I>0;

wherein M defines a desired number of market risk factor samples, S defines a desired number of systemic credit driver samples for each of M market risk factor samples, and I defines a desired number of idiosyncratic credit risk factor samples for each of S systemic credit driver samples;

partitioning, by the at least one computer processor, said portfolio of instruments into a first sub-portfolio and a second sub-portfolio;

the at least one computer processor generating MS conditional loss distributions for said first sub-portfolio by performing acts comprising:

the at least one computer processor generating N simulated loss samples for said first sub-portfolio, wherein N =MSI, over said first time horizon by performing acts comprising:

the at least one computer processor generating N scenarios for said first sub-portfolio, said N scenarios for said first sub-portfolio defined by N sets of X, Y, and Z values $(X_m, Y_{ms}, Z_{msi})$ for all m from 1 to M, for all s from 1 to S, and for all i from 1 to I;

wherein said act of the at least one computer processor generating N scenarios for said first sub-portfolio comprises:

for each m from 1 to M, generating a sample, having index m, of a vector of normal random variables represented by $\Xi$;

for each m from 1 to M and for each s from 1 to S, generating a random sample, having index ms, of $\Delta Y$ from a conditional distribution of $\Delta Y$ derived from the sample of the vector $\Xi$ having index m and from at least one of the one or more co-variance matrices, $\Delta Y$ being an increment of Y;

for each m from 1 to M and for each s from 1 to S and for each i from 1 to I, independently generating a random sample, having index msi, of $\Delta Z$, $\Delta Z$ being an increment of Z; and computing said N sets of X, Y, and Z values $(X_m, Y_{ms}, Z_{msi})$ for all m from 1 to M, for all s from 1 to S, and for all i from 1 to I, wherein $X_m$ is calculated as a value of X at the first time horizon based on a previous value of $X_m$, the at least one function associated with X, and the sample having index m of the vector $\Xi$, wherein $Y_{ms}$ is calculated as a value of Y at the first time horizon based on a previous value of $Y_{ms}$, the at least one function associated with Y, and the random sample having index ms of $\Delta Y$, wherein $Z_{msi}$ is calculated as a value of Z at the first time horizon based on a previous value of $Z_{msi}$, the at least one function associated with Z, and the random sample having index msi of $\Delta Z$, and wherein if said first time horizon comprises exactly one time step, said previous value of $X_m$, $Y_{ms}$, and $Z_{msi}$ is the start value associated with X, Y and Z respectively, for all m from 1 to M, for all s from 1 to S, and for all i from 1 to I;

and computing, by the at least one computer processor, said N simulated loss samples by simulating the first sub-portfolio over the N scenarios over said first time horizon; and for each $(X_m, Y_{ms})$ for all m from 1 to M and for all s from 1 to S of said N scenarios for said first sub-portfolio, calculate a conditional loss distribution $F_{X_m Y_{ms}}$ for said first time horizon to generate said MS conditional loss distributions for the first sub-portfolio;

the at least one computer processor generating MS conditional loss distributions for said second sub-portfolio by performing acts comprising:

identifying MS scenarios for said second sub-portfolio, wherein said MS scenarios for said second sub-portfolio comprise each of the MS scenarios for said first sub-portfolio defined by MS sets of X and Y values $(X_m, Y_{ms})$ for all m from 1 to M, and for all s from 1 to S obtained for the first sub-portfolio; and analytically deriving a conditional loss distribution $F_{X_m Y_{ms}}$ for each of said MS scenarios for said second sub-portfolio to generate said MS conditional loss distributions for said second sub-portfolio;

for each m from 1 to M and each s from 1 to S, the at least one computer processor convoluting the ms-th conditional loss distribution for said first sub-portfolio with the ms-th conditional loss distribution for said second sub-portfolio; wherein MS conditional loss distributions for said portfolio are produced;

producing, by the at least one computer processor, an unconditional loss distribution $\hat{F}$ for said first time horizon as a mixture of the MS conditional loss distributions for said portfolio; and providing, by the at least one computer processor, the unconditional loss distribution $\hat{F}$ for said first time horizon for calculating one or more risk measures from said unconditional loss distribution $\hat{F}$, said one or more risk measures for use in evaluating risk associated with said portfolio.

2. The method of claim 1, further comprising:
calculating said one or more risk measures from said unconditional loss distribution $\hat{F}$; and
at least one of storing said one or more risk measures in said at least one memory or outputting said one or more risk measures.

3. The method of claim 1, wherein said first time horizon comprises k time steps, each of said k time steps ending at time $t_k$, where k>1; wherein at least one of said one or more co-variance matrices is associated with a k-th time step; wherein said method further comprises, for each time step j, for j from 1 to k−1, performing the following acts prior to said act of the at least one computer processor generating N scenarios for said first sub-portfolio:

for each m from 1 to M, generating a sample, having index m, of a vector of normal random variables represented by $\Xi$;

for each m from 1 to M and for each s from 1 to S, generating a random sample, having index ms, of $\Delta Y$ from a conditional distribution of $\Delta Y$ derived from the sample of the vector $\Xi$ having index m and from at least one of the one or more co-variance matrices, $\Delta Y$ being an increment of Y;

for each m from 1 to M and for each s from 1 to S and for each i from 1 to I, independently generating a random sample, having index msi, of $\Delta Z$, $\Delta Z$ being an increment of Z; and computing said N sets of X, Y, and Z values $(X_m, Y_{ms}, Z_{msi})$ for all m from 1 to M, for all s from 1 to S, and for all i from 1 to I, wherein $X_m$ is calculated as a value of X at time $t_j$ based on a value of $X_m$ at time $t_{j-1}$, the at least one function associated with X, and the sample having index m of the vector $\Xi$, wherein $Y_{ms}$ is calculated as a value of Y at time $t_j$ based on a value of $Y_{ms}$ at time $t_{j-1}$, the at least one function associated with Y, and the random sample having index ms of $\Delta Y$, wherein $Z_{msi}$ is calculated as a value of Z at time $t_j$ based on a value of $Z_{msi}$ at time $t_{j-1}$, the at least one function associated with Z, and the random sample having index msi of $\Delta Z$, and wherein said value of $X_m$, $Y_{ms}$, and $Z_{msi}$ at time $t_0$ is the start value associated with X, Y and Z respectively, for all m from 1 to M, for all s from 1 to S, and for all i from 1 to I;

and wherein said method further comprises setting said previous value of $X_m$, $Y_{ms}$, and $Z_{msi}$ for use in calculating $X_m$, $Y_{ms}$, and $Z_{msi}$ at the first time horizon to the value of $X_m$, $Y_{ms}$, and $Z_{msi}$ at time $t_{k-1}$ respectively, for all m from 1 to M, for all s from 1 to S, and for all i from 1 to I.

4. The method of claim 1, wherein said one or more risk measures comprises at least one risk measure selected from the group consisting of: a mean of said unconditional loss distribution $\hat{F}$, a variance of said unconditional loss distribution $\hat{F}$, a value at risk equalling a specified p-quantile of said unconditional loss distribution $\hat{F}$, an unexpected loss comprising a value at risk equalling a specified p-quantile less a mean of said unconditional loss distribution $\hat{F}$, and an expected shortfall comprising an expected value of losses that exceed a specified p-quantile of said unconditional loss distribution $\hat{F}$.

5. The method of claim 1, wherein X comprises at least one process each selected from the group consisting of: a Brownian motion with drift, a Brownian motion without drift, an Ornstein-Uhlenbeck process, a Hull-White process, a Geometric Brownian motion process, and a Black-Karasinski process.

6. The method of claim 1, wherein Y comprises a Brownian motion process, such that each $\Delta Y$ is normally distributed.

7. The method of claim 1, wherein the conditional distribution of $\Delta Y$ derived from the sample of the vector $\Xi$ having index m and from at least one of the one or more co-variance matrices is represented by a mean and at least one second co-variance matrix.

8. The method of claim 1, wherein said analytically deriving the conditional loss distribution $F_{X_n Y_{ms}}$ comprises employing at least one technique selected from the group consisting of: Law of Large Numbers, Central Limit Theorem, convolution and Fast Fourier Transforms.

9. The method of claim 1, wherein said identifying the first parameter M and the second parameter S comprises:
identifying an acceptable variance level for a selected one of said one or more risk measures;
computing a variance of estimates of said selected one risk measure;
determining M and S such that said variance is within said acceptable variance level.

10. The method of claim 9, wherein said selected one risk measure comprises a value at risk, wherein $l_p$ is a p-quantile, and wherein said variance is computed according to the following formula having coefficients $v_1^0$, $v_2^0$, $v_3^0$:

$$\text{Var}(\hat{l}_p) = \frac{1}{f(l_p)^2}\left(\frac{v_1^0}{M} + \frac{v_2^0}{MS} + \frac{v_3^0}{MSI}\right).$$

11. The method of claim 10, wherein:

$$v_1^0 = Var(E[F_{X,Y}(l_p)|X]), v_2^0 = E[Var(F_{X,Y}(l_p)|X)] \text{ and}$$

$$v_3^0 = E[((F_{X,Y}^A)^2 * F_{X,Y}^{MC})(l_p)] - E[\{F_{X,Y}(l_p)\}^2].$$

12. The method of claim 10, further comprising performing an initial pilot simulation to estimate coefficients $v_1^0$, $v_2^0$, $v_3^0$ and density $f(l_p)$ with M, S and I chosen to be large.

13. The method of claim 1, wherein said identifying the first parameter M, the second parameter S, and the third parameter I, comprises:
identifying a time window available for said simulation of length T; and
wherein M, S and I are identified by solving an optimization problem.

14. The method of claim 13, wherein said one or more risk measures comprise a value at risk, wherein $c_M$ is a processing time for each market risk factor sample, wherein $c_S$ is a processing time for each systemic credit driver sample, wherein $c_I$ is a processing time for each idiosyncratic credit risk factor sample, wherein $v_1^0$, $v_2^0$, and $v_3^0$ are coefficients, and wherein said optimization problem comprises:

$$\min_{M,S,I} \frac{v_1^0}{M} + \frac{v_2^0}{MS} + \frac{v_3^0}{MSI}$$

s.t.

-continued $$c_M M + c_S MS + c_I MSI \leq T$$
$$M \geq 1$$
$$S \geq 1$$
$$I \geq 1.$$

15. The method of claim 14, wherein:

$$v_1^0 = Var(E[F_{X,Y}(l_p)|X]), v_2^0 = E[Var(F_{X,Y}(l_p)|X)] \text{ and}$$

$$v_3^0 = E[((F_{X,Y}^A)^2 * F_{X,Y}^{MC})(l_p)] - E[\{F_{X,Y}(l_p)\}^2].$$

16. The method of claim 14, further comprising performing an initial pilot simulation to estimate coefficients $v_1^0$, $v_2^0$, $v_3^0$ with M, S and I chosen to be large.

17. A system for generating an integrated market and credit loss distribution for the purpose of calculating one or more risk measures associated with a portfolio of instruments by performing a simulation on a computer, wherein said computer comprises:
   at least one processor configured to execute at least a compound risk factor sampling module and a risk measure module;
   at least one memory coupled to the at least one processor; and
   at least one database;
   wherein the at least one processor is configured to:
   identify at least a first time horizon for said simulation;
   receive data identifying X, the data identifying X storable in the at least one database, wherein X is a vector of scalar-valued market risk factor processes, each market risk factor process defined by a start value, at least one function representing a model, and zero or more parameters for the model;
   receiving data identifying Y, the data identifying Y storable in the at least one database, wherein Y is a vector of scalar-valued systemic credit driver processes, each systemic credit driver process defined by a start value, at least one function representing a model, and zero or more parameters for the model;
   receiving data identifying Z, the data identifying Z storable in the at least one database, wherein Z is a vector of scalar-valued idiosyncratic credit risk factor processes indexed by counterparty name, each idiosyncratic credit risk factor process defined by a start value, at least one function representing a model, and zero or more parameters for the model;
   receive data comprising one or more co-variance matrices that define the joint evolution of X and Y over said first time horizon, the data comprising the one or more co-variance matrices storable in the at least one database;
   identify a first parameter M wherein M>0, a second parameter S wherein S>1, and a third parameter I wherein I>0;
     wherein M defines a desired number of market risk factor samples, S defines a desired number of systemic credit driver samples for each of M market risk factor samples, and I defines a desired number of idiosyncratic credit risk factor samples for each of S systemic credit driver samples;
   partition said portfolio of instruments into a first sub-portfolio and a second sub-portfolio;
   generate MS conditional loss distributions for said first sub-portfolio by performing acts comprising:
     generating N simulated loss samples for said first sub-portfolio, wherein N =MSI, over said first time horizon by performing acts comprising:
       generating N scenarios for said first sub-portfolio, said N scenarios for said first sub-portfolio defined by N sets of X, Y, and Z values $(X_m, Y_{ms}, Z_{msi})$ for all m from 1 to M, for all s from 1 to S, and for all i from 1 to I;
       wherein said act of generating N scenarios for said first sub-portfolio comprises:
         for each m from 1 to M, generating a sample, having index m, of a vector of normal random variables represented by $\Xi$;
         for each m from 1 to M and for each s from 1 to S, generating a random sample, having index ms, of $\Delta Y$ from a conditional distribution of $\Delta Y$ derived from the sample of the vector $\Xi$ having index m and from at least one of the one or more co-variance matrices, $\Delta Y$ being an increment of Y;
         for each m from 1 to M and for each s from 1 to S and for each i from 1 to I, independently generating a random sample, having index msi, of $\Delta Z$, $\Delta Z$ being an increment of Z; and
         computing said N sets of X, Y, and Z values $(X_m, Y_{ms}, Z_{msi})$ for all m from 1 to M, for all s from 1 to S, and for all i from 1 to I,
           wherein $X_m$ is calculated as a value of X at the first time horizon based on a previous value of $X_m$, the at least one function associated with X, and the sample having index m of the vector $\Xi$,
           wherein $Y_{ms}$ is calculated as a value of Y at the first time horizon based on a previous value of $Y_{ms}$, the at least one function associated with Y, and the random sample having index ms of $\Delta Y$,
           wherein $Z_{msi}$ is calculated as a value of Z at the first time horizon based on a previous value of $Z_{msi}$, the at least one function associated with Z, and the random sample having index msi of $\Delta Z$, and
           wherein if said first time horizon comprises exactly one time step, said previous value of $X_m$, $Y_{ms}$, and $Z_{msi}$ is the start value associated with X, Y and Z respectively, for all m from 1 to M, for all s from 1 to S, and for all i from 1 to I;
     and computing, by the at least one processor, said N simulated loss samples by simulating the first sub-portfolio over the N scenarios over said first time horizon; and
     for each $(X_m, Y_{ms})$ for all m from 1 to M and for all s from 1 to S of said N scenarios for said first sub-portfolio, calculate a conditional loss distribution $F_{X_m Y_{ms}}$ for said first time horizon to generate said MS conditional loss distributions for the first sub-portfolio;
   generate MS conditional loss distributions for said second sub-portfolio by performing acts comprising:
     identifying MS scenarios for said second sub-portfolio, wherein said MS scenarios for said second sub-portfolio comprise each of the MS scenarios for said first sub-portfolio defined by MS sets of X and Y values $(X_m, Y_{ms})$ for all m from 1 to M, and for all s from 1 to S obtained for the first sub-portfolio; and
     analytically deriving a conditional loss distribution $F_{X_m Y_{ms}}$ for each of said MS scenarios for said second sub-portfolio to generate said MS conditional loss distributions for said second sub-portfolio;
   for each m from 1 to M and each s from 1 to S, convolute the ms-th conditional loss distribution for said first sub-portfolio with the ms-th conditional loss distribution for said second sub-portfolio; wherein MS conditional loss distributions for said portfolio are produced;

produce an unconditional loss distribution $\hat{F}$ for said first time horizon as a mixture of the MS conditional loss distributions for said portfolio; and provide the unconditional loss distribution $\hat{F}$ for said first time horizon for calculating one or more risk measures from said unconditional loss distribution $\hat{F}$, said one or more risk measures for use in evaluating risk associated with said portfolio.

18. The system of claim 17, wherein the at least one processor is further configured to:

calculate said one or more risk measures from said unconditional loss distribution $\hat{F}$; and at least one of store said one or more risk measures in said at least one memory or output said one or more risk measures.

19. The system of claim 17, wherein said first time horizon comprises k time steps, each of said k time steps ending at time $t_k$, where k>1; wherein at least one of said one or more co-variance matrices is associated with a k-th time step; wherein the at least one processor is further configured to, for each time step j, for j from 1 to k-1, prior to generating N scenarios for said first sub-portfolio:

for each m from 1 to M, generate a sample, having index m, of a vector of normal random variables represented by $\Xi$;

for each m from 1 to M and for each s from 1 to S, generate a random sample, having index ms, of $\Delta Y$ from a conditional distribution of $\Delta Y$ derived from the sample of the vector $\Xi$ having index m and from at least one of the one or more co-variance matrices, $\Delta Y$ being an increment of Y;

for each m from 1 to M and for each s from 1 to S and for each i from 1 to I, independently generate a random sample, having index msi, of $\Delta Z$, $\Delta Z$ being an increment of Z; and compute said N sets of X, Y, and Z values $(X_m, Y_{ms}, Z_{msi})$ for all m from 1 to M, for all s from 1 to S, and for all i from 1 to I, wherein $X_m$ is calculated as a value of X at time $t_j$ based on a value of $X_m$ at time $t_{j-1}$, the at least one function associated with X, and the sample having index m of the vector $\Xi$, wherein $Y_{ms}$ is calculated as a value of Y at time $t_j$ based on a value of $Y_{ms}$ at time $t_{j-1}$, the at least one function associated with Y, and the random sample having index ms of $\Delta Y$, wherein $Z_{msi}$ is calculated as a value of Z at time $t_j$ based on a value of $Z_{msi}$ at time $t_{j-1}$, the at least one function associated with Z, and the random sample having index msi of $\Delta Z$, and wherein said value of $X_m$, $Y_{ms}$, and $Z_{msi}$ at time $t_0$ is the start value associated with X, Y and Z respectively, for all m from 1 to M, for all s from 1 to S, and for all i from 1 to I;

and wherein the processor is further configured to set said previous value of $X_m$, $Y_{ms}$, and $Z_{msi}$ for use in calculating $X_m$, $Y_{ms}$, and $Z_{msi}$ at the first time horizon to the value of $X_m$, $Y_{ms}$, and $Z_{msi}$ at time $t_{k-1}$ respectively, for all m from 1 to M, for all s from 1 to S, and for all i from 1 to I.

20. The system of claim 17, wherein said one or more risk measures comprise at least one risk measure selected from the group consisting of: a mean of said unconditional loss distribution $\hat{F}$, a variance of said unconditional loss distribution $\hat{F}$, a value at risk equalling a specified p-quantile of said unconditional loss distribution $\hat{F}$, an unexpected loss comprising a value at risk equalling a specified p-quantile less a mean of said unconditional loss distribution $\hat{F}$, and an expected shortfall comprising an expected value of losses that exceed a specified p-quantile of said unconditional loss distribution $\hat{F}$.

21. The system of claim 17, wherein X comprises at least one process each selected from the group consisting of: a Brownian motion with drift, a Brownian motion without drift, an Ornstein-Uhlenbeck process, a Hull-White process, a Geometric Brownian motion process, and a Black-Karasinski process.

22. The system of claim 17, wherein Y comprises a Brownian motion process, such that each $\Delta Y$ is normally distributed.

23. The system of claim 17, wherein the conditional distribution of $\Delta Y$ derived from the sample of the vector $\Xi$ having index m and from the at least one of the one or more co-variance matrices is represented by a mean and at least one second co-variance matrix.

24. The system of claim 17, wherein the at least one processor is further configured to analytically derive the conditional loss distribution $F_{X_m, Y_{ms}}$ by employing at least one technique selected from the group consisting of: Law of Large Numbers, Central Limit Theorem, convolution and Fast Fourier Transforms.

25. The system of claim 17, wherein the at least one processor is configured to identify the first parameter M and the second parameter S by:

identifying an acceptable variance level for a selected one of said one or more risk measures;

computing a variance of estimates of said selected one risk measure;

determining M and S such that said variance is within said acceptable variance level.

26. The system of claim 25, wherein said selected one risk measure comprises a value at risk, wherein $l_p$ is a p-quantile, and wherein said variance is computed according to the following formula having coefficients $v_1^0, v_2^0, v_3^0$:

$$\text{Var}(\hat{l}_p) = \frac{1}{f(l_p)^2}\left(\frac{v_1^0}{M} + \frac{v_2^0}{MS} + \frac{v_3^0}{MSI}\right).$$

27. The system of claim 26, wherein:

$v_1^0 = Var(E[F_{X,Y}(l_p)|X])$, $v_2^0 = E[Var(F_{X,Y}(l_p)|X)]$ and $v_3^0 = E[((F_{X,Y}^A)^2 * F_{X,Y}^{MC})(l_p)] - E[\{F_{X,Y}(l_p)\}^2]$.

28. The system of claim 26, wherein the at least one processor is further configured to perform an initial pilot simulation to estimate coefficients $v_1^0, v_2^0, v_3^0$ and density $f(l_p)$ with M, S and I chosen to be large.

29. The system of claim 17, wherein the at least one processor is configured to identify the first parameter M, the second parameter S, and the third parameter I by:

identifying a time window available for said simulation of length T; and wherein M, S and I are identified by solving an optimization problem.

30. The system of claim 29, wherein said one or more risk measures comprise a value at risk, wherein $c_M$ is a processing time for each market risk factor sample, wherein $c_S$ is a processing time for each systemic credit driver sample, wherein $c_I$ is a processing time for each idiosyncratic credit risk factor sample, wherein $v_1^0, v_2^0,$ and $v_3^0$ are coefficients, and wherein said optimization problem comprises:

$$\min_{M,S,I} \frac{v_1^0}{M} + \frac{v_2^0}{MS} + \frac{v_3^0}{MSI}$$

s.t.

$$c_M M + c_S MS + c_I MSI \leq T$$
$$M \geq 1$$
$$S \geq 1$$
$$I \geq 1.$$

31. The system of claim 30, wherein:

$v_1^0 = Var(E[F_{X,Y}(l_p)|X])$, $v_2^0 = E[Var(F_{X,Y}(l_p)|X)]$ and $v_3^0 = E[((F_{X,Y}{}^A)^2 * F_{X,Y}{}^{MC})(l_p)] - E[\{F_{X,Y}(l_p)\}^2]$.

32. The system of claim 30, wherein the at least one processor is further configured to perform an initial pilot simulation to estimate coefficients $v_1^0$, $v_2^0$, $v_3^0$ with M, S and I chosen to be large.

33. A non-transitory computer-readable medium upon which a set of instructions are stored for execution on a computer, said computer comprising at least one processor and at least one memory, said non-transitory computer-readable medium comprising at least one module configured to perform a method for generating an integrated market and credit loss distribution for the purpose of calculating one or more risk measures associated with a portfolio of instruments by performing a simulation, said method comprising:

identifying at least a first time horizon for said simulation;

receiving data identifying X, wherein X is a vector of scalar-valued market risk factor processes, each market risk factor process defined by a start value, at least one function representing a model, and zero or more parameters for the model;

receiving data identifying Y, wherein Y is a vector of scalar-valued systemic credit driver processes, each systemic credit driver process defined by a start value, at least one function representing a model, and zero or more parameters for the model;

receiving data identifying Z, wherein Z is a vector of scalar-valued idiosyncratic credit risk factor processes indexed by counterparty name, each idiosyncratic credit risk factor process defined by a start value, at least one function representing a model, and zero or more parameters for the model;

receiving data comprising one or more co-variance matrices that define the joint evolution of X and Y over said first time horizon;

identifying a first parameter M wherein M>0, a second parameter S wherein S>1, and a third parameter I wherein I>0;

wherein M defines a desired number of market risk factor samples, S defines a desired number of systemic credit driver samples for each of M market risk factor samples, and I defines a desired number of idiosyncratic credit risk factor samples for each of S systemic credit driver samples;

partitioning said portfolio of instruments into a first sub-portfolio and a second sub-portfolio;

generating MS conditional loss distributions for said first sub-portfolio by performing acts comprising:

generating N simulated loss samples for said first sub-portfolio, wherein N =MSI, over said first time horizon by performing acts comprising:

generating N scenarios for said first sub-portfolio, said N scenarios for said first sub-portfolio defined by N sets of X, Y, and Z values $(X_m, Y_{ms}, Z_{msi})$ for all m from 1 to M, for all s from 1 to S, and for all i from 1 to I;

wherein said act of generating N scenarios for said first sub-portfolio comprises:

for each m from 1 to M, generating a sample, having index m, of a vector of normal random variables represented by $\Xi$;

for each m from 1 to M and for each s from 1 to S, generating a random sample, having index ms, of $\Delta Y$ from a conditional distribution of $\Delta Y$ derived from the sample of the vector $\Xi$ having index m and from at least one of the one or more co-variance matrices, $\Delta Y$ being an increment of Y;

for each m from 1 to M and for each s from 1 to S and for each i from 1 to I, independently generating a random sample, having index msi, of $\Delta Z$, $\Delta Z$ being an increment of Z; and computing said N sets of X, Y, and Z values $(X_m, Y_{ms}, Z_{msi})$ for all m from 1 to M, for all s from 1 to S, and for all i from 1 to I, wherein $X_m$ is calculated as a value of X at the first time horizon based on a previous value of $X_m$, the at least one function associated with X, and the sample having index m of the vector $\Xi$, wherein $Y_{ms}$ is calculated as a value of Y at the first time horizon based on a previous value of $Y_{ms}$, the at least one function associated with Y, and the random sample having index ms of $\Delta Y$, wherein $Z_{msi}$ is calculated as a value of Z at the first time horizon based on a previous value of $z_{msi}$, the at least one function associated with Z, and the random sample having index msi of $\Delta Z$, and wherein if said first time horizon comprises exactly one time step, said previous value of $X_m$, $Y_{ms}$, and $Z_{msi}$ is the start value associated with X, Y and Z respectively, for all m from 1 to M, for all s from 1 to S, and for all i from 1 to I;

and computing said N simulated loss samples by simulating the first sub-portfolio over the N scenarios over said first time horizon; and for each $(X_m, Y_{ms})$ for all m from 1 to M and for all s from 1 to S of said N scenarios for said first sub-portfolio, calculate a conditional loss distribution $F_{X_m, Y_{ms}}$ for said first time horizon to generate said MS conditional loss distributions for the first sub-portfolio;

generating MS conditional loss distributions for said second sub-portfolio by performing acts comprising:

identifying MS scenarios for said second sub-portfolio, wherein said MS scenarios for said second sub-portfolio comprise each of the MS scenarios for said first sub-portfolio defined by MS sets of X and Y values $(X_m, Y_{ms})$ for all m from 1 to M, and for all s from 1 to S obtained for the first sub-portfolio; and analytically deriving a conditional loss distribution $F_{X_m, Y_{ms}}$ for each of said MS scenarios for said second sub-portfolio to generate said MS conditional loss distributions for said second sub-portfolio;

for each m from 1 to M and each s from 1 to S, convoluting the ms-th conditional loss distribution for said first sub-portfolio with the ms-th conditional loss distribution for said second sub-portfolio; wherein MS conditional loss distributions for said portfolio are produced;

producing by the at least one processor an unconditional loss distribution $\hat{F}$ for said first time horizon as a mixture of the MS conditional loss distributions for said portfolio; and providing the unconditional loss distribution $\hat{F}$ for said first time horizon for calculating one or more risk measures from said unconditional loss distribution $\hat{F}$, said one or more risk measures for use in evaluating risk associated with said portfolio.

34. The non-transitory computer-readable medium of claim 33, the method further comprising:

calculating said one or more risk measures from said unconditional loss distribution $\hat{F}$; and at least one of storing said one or more risk measures in said at least one memory or outputting said one or more risk measures.

35. The non-transitory computer-readable medium of claim 33, wherein said first time horizon comprises k time steps, each of said k time steps ending at time $t_k$, where k>1; wherein at least one of said one or more co-variance matrices is associated with a k-th time step; wherein said method further comprises, for each time step j, for j from 1 to k-1, performing the following acts prior to said act of generating N scenarios for said first sub-portfolio:

for each m from 1 to M, generating a sample, having index m, of a vector of normal random variables represented by $\Xi$;

for each m from 1 to M and for each s from 1 to S, generating a random sample, having index ms, of $\Delta Y$ from a conditional distribution of $\Delta Y$ derived from the sample of the vector $\Xi$ having index m and from at least one of the one or more co-variance matrices, $\Delta Y$ being an increment of Y;

for each m from 1 to M and for each s from 1 to S and for each i from 1 to I, independently generating a random sample, having index msi, of $\Delta Z$, $\Delta Z$ being an increment of Z; and computing said N sets of X, Y, and Z values $(X_m, Y_{ms}, Z_{msi})$ for all m from 1 to M, for all s from 1 to S, and for all i from 1 to I, wherein $X_m$ is calculated as a value of X at time $t_j$ based on a value of $X_m$ at time $t_{j-1}$, the at least one function associated with X, and the sample having index m of the vector $\Xi$, wherein $Y_{ms}$ is calculated as a value of Y at time $t_j$ based on a value of $Y_{ms}$ at time $t_{j-1}$, the at least one function associated with Y, and the random sample having index ms of $\Delta Y$, wherein $Z_{msi}$ is calculated as a value of Z at time $t_j$ based on a value of $Z_{msi}$ at time $t_{j-1}$, the at least one function associated with Z, and the random sample having index msi of $\Delta Z$, and wherein said value of $X_m$, $Y_{ms}$, and $Z_{msi}$ at time $t_0$ is the start value associated with X, Y and Z respectively, for all m from 1 to M, for all s from 1 to S, and for all i from 1 to I;

and wherein said method further comprises setting said previous value of $X_m$, $Y_{ms}$, and $Z_{msi}$ for use in calculating $X_m$, $Y_{ms}$, and $Z_{msi}$ at the first time horizon to the value of $X_m$, $Y_{ms}$, and $Z_{msi}$ at time $t_{k-1}$ respectively, for all m from 1 to M, for all s from 1 to S, and for all i from 1 to I.

36. The non-transitory computer-readable medium of claim 33, wherein said one or more risk measures comprise at least one risk measure selected from the group consisting of: a mean of said unconditional loss distribution $\hat{F}$, a variance of said unconditional loss distribution $\hat{F}$, a value at risk equalling a specified p-quantile of said unconditional loss distribution $\hat{F}$, an unexpected loss comprising a value at risk equalling a specified p-quantile less a mean of said unconditional loss distribution $\hat{F}$, and an expected shortfall comprising an expected value of losses that exceed a specified p-quantile of said unconditional loss distribution $\hat{F}$.

37. The non-transitory computer-readable medium of claim 33, wherein X comprises at least one process each selected from the group consisting of: a Brownian motion with drift, a Brownian motion without drift, an Ornstein-Uhlenbeck process, a Hull-White process, a Geometric Brownian motion process, and a Black-Karasinski process.

38. The non-transitory computer-readable medium of claim 33, wherein Y comprises a Brownian motion process, such that each $\Delta Y$ is normally distributed.

39. The non-transitory computer-readable medium of claim 33, wherein the conditional distribution of $\Delta Y$ derived from the sample of the vector $\Xi$ having index m and from the at least one of the one or more co-variance matrices is represented by a mean and at least one second co-variance matrix.

40. The non-transitory computer-readable medium of claim 33, wherein said analytically deriving the conditional loss distribution $F_{X_m Y_{ms}}$ comprises employing at least one technique selected from the group consisting of: Law of Large Numbers, Central Limit Theorem, convolution and Fast Fourier Transforms.

41. The non-transitory computer-readable medium of claim 33, wherein said identifying the first parameter M and the second parameter S comprises:

identifying an acceptable variance level for a selected one of said one or more risk measures;

computing a variance of estimates of said selected one risk measure;

determining M and S such that said variance is within said acceptable variance level.

42. The non-transitory computer-readable medium of claim 41, wherein said selected one risk measure comprises a value at risk, wherein $l_p$ is a p-quantile, and wherein said variance is computed according to the following formula having coefficients $v_1^0, v_2^0, v_3^0$:

$$\text{Var}(\hat{l}_p) = \frac{1}{f(l_p)^2}\left(\frac{v_1^0}{M} + \frac{v_2^0}{MS} + \frac{v_3^0}{MSI}\right).$$

43. The non-transitory computer-readable medium of claim 42, wherein:

$v_1^0 = Var(E[F_{X,Y}(l_p)|X])$, $v_2^0 = E[Var(F_{X,P})|X)]$ and $v_3^0 = E[((F_{X,Y}^A)^2 * F_{X,Y}^{MC})(l_p)] - E[\{F_{X,Y}(l_p)\}^2]$.

44. The non-transitory computer-readable medium of claim 42, the method further comprising performing an initial pilot simulation to estimate coefficients $v_1^0 v_2^0, v_3^0$ and density $f(l_p)$ with M, S and I chosen to be large.

45. The non-transitory computer-readable medium of claim 33, wherein said identifying the first parameter M, the second parameter S, and the third parameter I, comprises:

identifying a time window available for said simulation of length T; and wherein M, S and I are identified by solving an optimization problem.

46. The non-transitory computer-readable medium of claim 45, wherein said one or more risk measures comprise a value at risk, wherein $c_M$ is a processing time for each market risk factor sample, wherein $c_S$ is a processing time for each systemic credit driver sample, wherein $c_I$ is a processing time for each idiosyncratic credit risk factor sample, wherein $v_1^0$, $v_2^0$, and $v_3^0$ are coefficients, and wherein said optimization problem comprises:

$$\min_{M,S,I} \frac{v_1^0}{M} + \frac{v_2^0}{MS} + \frac{v_3^0}{MSI}$$

s.t.

$$c_M M + c_S MS + c_I MSI \leq T$$
$$M \geq 1$$
$$S \geq 1$$
$$I \geq 1.$$

47. The non-transitory computer-readable medium of claim 46, wherein:

$$v_1^0 = Var(E[F_{X,Y}(l_p)|X]), v_2^0 = E[Var(F_{X,Y}(l_p)|X)] \text{ and}$$

$$v_3^0 = E[((F_{X,Y}^A)^2 * F_{X,Y}^{MC})(l_p)] - E[\{F_{X,Y}(l_p)\}^2].$$

48. The non-transitory computer-readable medium of claim 46, the method further comprising performing an initial pilot simulation to estimate coefficients $v_1^0, v_2^0, v_3^0$ with M, S and I chosen to be large.

* * * * *